United States Patent
Hansen et al.

(10) Patent No.: US 10,082,142 B2
(45) Date of Patent: Sep. 25, 2018

(54) SCREW AIR COMPRESSOR WITH BYPASS

(71) Applicants: Craig N. Hansen, Plymouth, MN (US); Paul C. Cross, Shorewood, MN (US)

(72) Inventors: Craig N. Hansen, Plymouth, MN (US); Paul C. Cross, Shorewood, MN (US)

(73) Assignee: HANSEN ENGINE CORPORATION, Plymouth, MN (US)

( * ) Notice: Subject to any disclaimer, the term of this patent is extended or adjusted under 35 U.S.C. 154(b) by 0 days.

(21) Appl. No.: 15/786,854

(22) Filed: Oct. 18, 2017

(65) Prior Publication Data

US 2018/0106184 A1 Apr. 19, 2018

Related U.S. Application Data

(62) Division of application No. 15/338,340, filed on Oct. 29, 2016, now Pat. No. 9,797,299.

(60) Provisional application No. 62/249,874, filed on Nov. 2, 2015.

(51) Int. Cl.
| | |
|---|---|
| *F04C 28/26* | (2006.01) |
| *F04C 23/00* | (2006.01) |
| *F02B 39/16* | (2006.01) |
| *F02B 39/06* | (2006.01) |
| *F04C 18/16* | (2006.01) |
| *F02B 33/36* | (2006.01) |

(52) U.S. Cl.
CPC .............. *F04C 28/26* (2013.01); *F02B 33/36* (2013.01); *F02B 39/06* (2013.01); *F02B 39/16* (2013.01); *F04C 18/16* (2013.01); *F04C 23/006* (2013.01); *F04C 2250/10* (2013.01)

(58) Field of Classification Search
CPC .......... F04C 18/16; F02B 33/36; F02B 39/06; F02B 39/16
See application file for complete search history.

(56) References Cited

U.S. PATENT DOCUMENTS

| | | |
|---|---|---|
| 27,384 A | 3/1860 | Rains |
| 30,157 A | 9/1860 | Roots |
| 40,731 A | 12/1863 | Bristol |
| 1,801,960 A | 4/1931 | Houser |
| 1,868,147 A | 7/1932 | Kruse |
| 2,201,014 A | 5/1940 | Scheerer |
| 3,088,659 A | 5/1963 | Nilsson et al. |
| 3,996,750 A | 12/1976 | Brear |

(Continued)

OTHER PUBLICATIONS

International Application No. PCT/US16/59918 Written Opinion of the International Searching Authority, dated Feb. 24, 2017.

*Primary Examiner* — Mary A Davis
(74) *Attorney, Agent, or Firm* — Richard John Bartz

(57) ABSTRACT

A supercharged internal combustion engine has a supercharger operable to selectively supply a mass of air from below through above atmospheric air pressure according to the operating requirements of the engine. The supercharger has a shuttle combined with a throttle valve that controls the mass of air directed to an air mass bypass opening and supplied to the internal combustion engine. The shuttle has rollers that ride on rails that allow the shuttle to move to open and close the air mass bypass opening in communication with a casing that directs a mass of atmospheric air and a bypass mass of air interfused with the mass of atmospheric air to an air mass inlet of the supercharger.

25 Claims, 19 Drawing Sheets

(56) References Cited

U.S. PATENT DOCUMENTS

| | | | |
|---|---|---|---|
| 4,281,975 A | 8/1981 | Blackwell | |
| 4,991,562 A * | 2/1991 | Chujo | F04C 28/26 |
| | | | 123/564 |
| 5,730,586 A * | 3/1998 | Sayama | F04C 28/26 |
| | | | 123/564 |
| 6,227,834 B1 | 5/2001 | Andersen | |
| 6,241,498 B1 | 6/2001 | Hansen et al. | |
| 8,539,769 B2 | 9/2013 | Hansen et al. | |
| 9,797,299 B2 * | 10/2017 | Hansen | F04C 18/16 |
| 2013/0315766 A1 | 11/2013 | Kitano | |

* cited by examiner

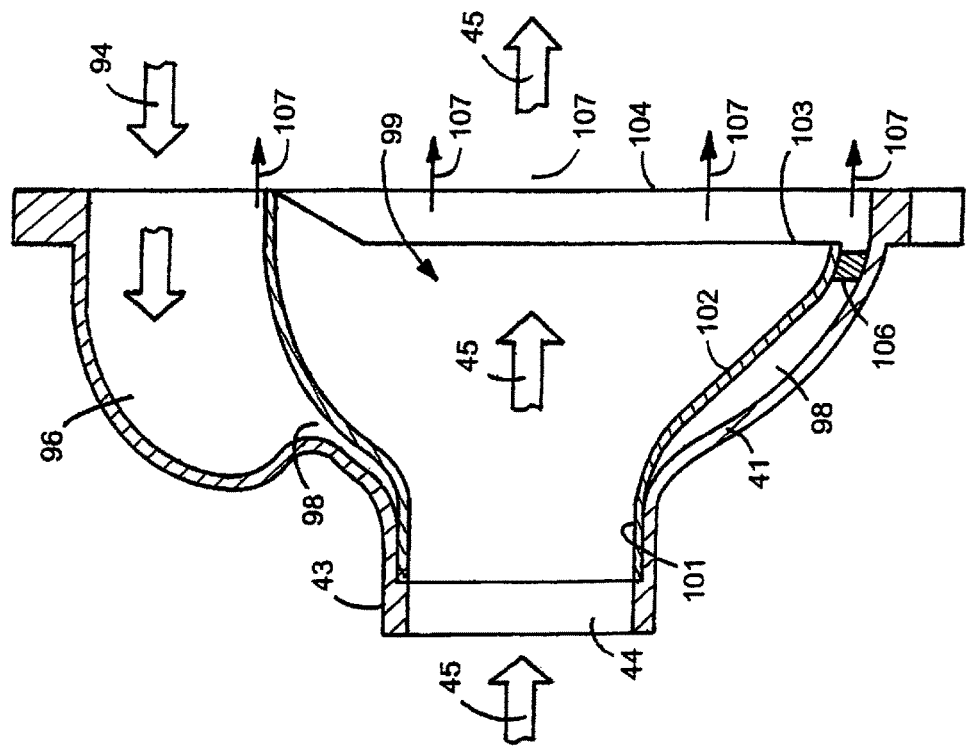
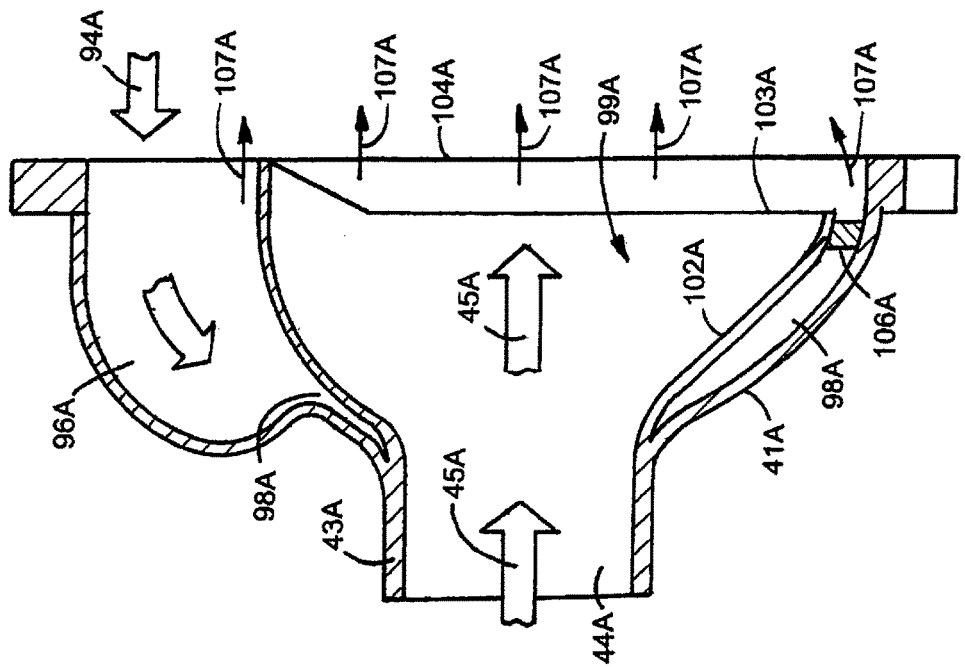

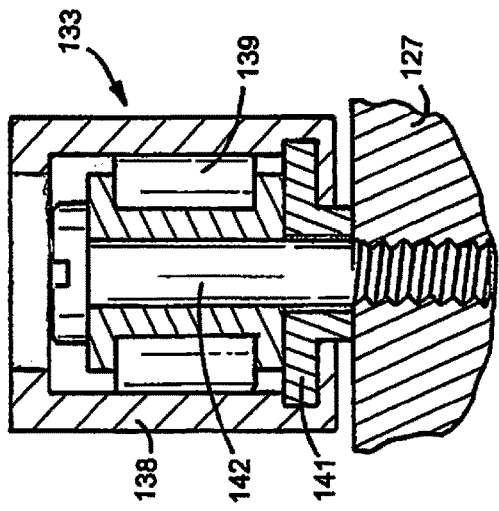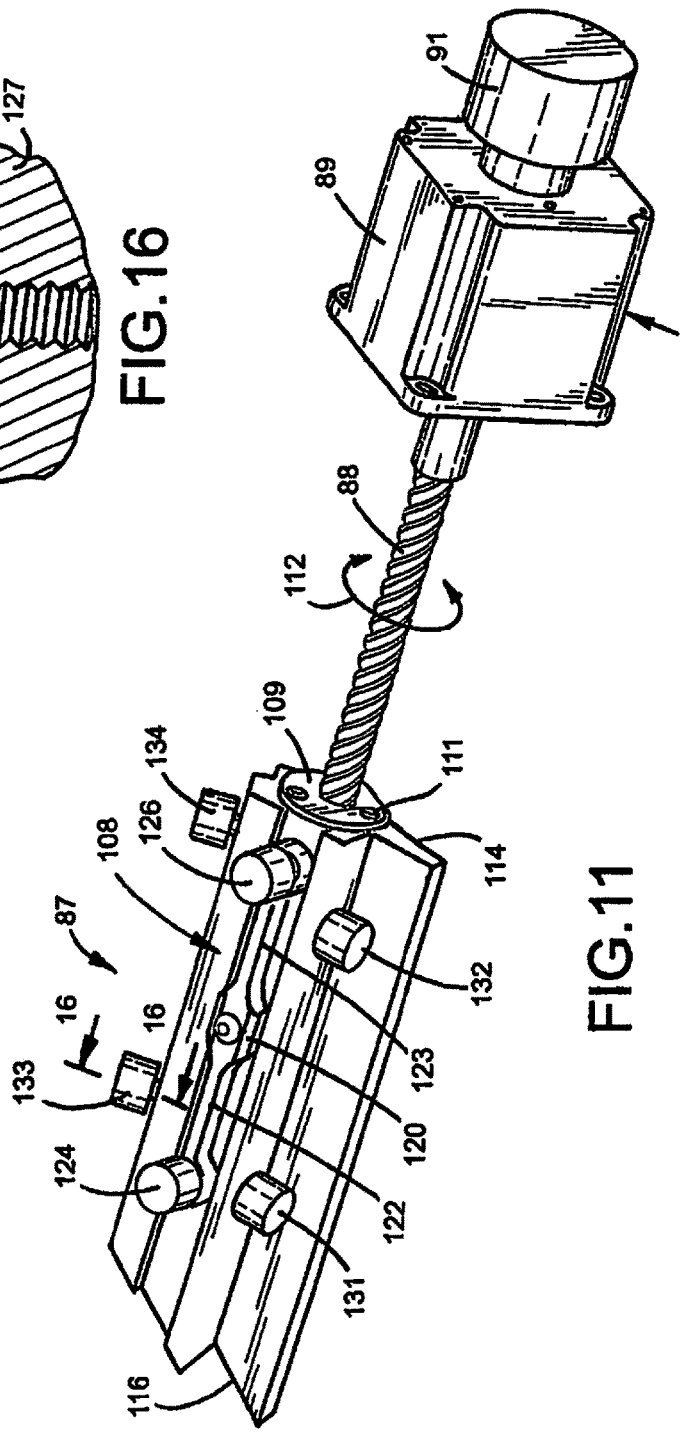

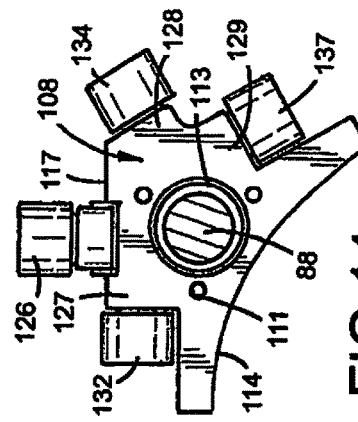
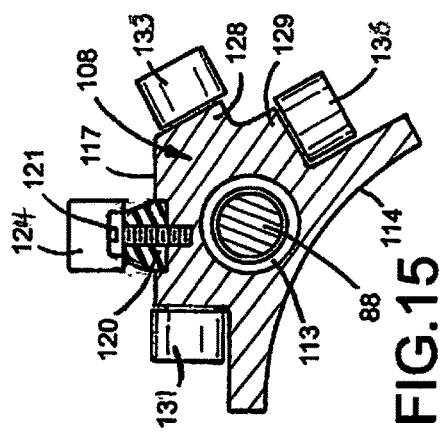
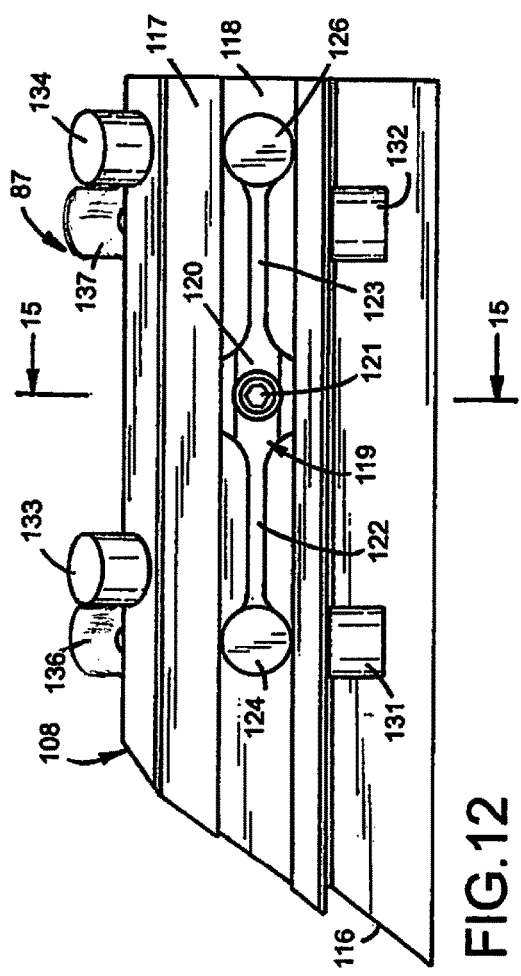
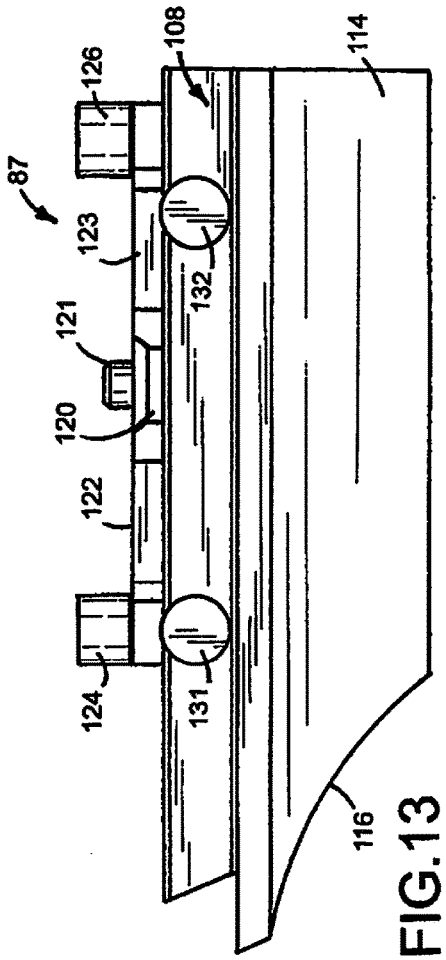

SCREW AIR COMPRESSOR WITH BYPASS

CROSS REFERENCE TO RELATED APPLICATION

This application is a division of U.S. patent application Ser. No. 15/338,340 filed Oct. 29, 2016. U.S. patent application Ser. No. 15/338,340 claims the priority of U.S. patent application Ser. No. 62/249,874 filed Nov. 2, 2015.

FIELD OF THE INVENTION

The invention is in the technical art of superchargers for internal combustion engines operable to supply air to the engines that ranges selectively from below through above atmospheric pressure conditions according to the power requirements of the engines to increase fuel efficiency and performance of the engines.

BACKGROUND OF THE INVENTION

Air displacement devices are used to increase the supply of air and fuel to internal combustion engines to boost engine horsepower. An example of an air displacement device is the "Roots blower" shown by P. H. Roots in U.S. Pat. No. 30,157 and G. Scheerer in U.S. Pat. No. 2,201,014. Each of these devices has a belt-driven shaft that drives two close-clearance rotors. The rotating rotors during each rotation sweep out a specific volume of air to an air receiver, such as an internal combustion engine. The rotational speed of the rotors largely determines the unthrottled volume of air discharged by the device to an air receiver.

C. N. Hansen and P. C. Cross in U.S. Pat. No. 6,241,498 disclose a supercharger having cooperating rotors drivably connected to an internal combustion engine for delivering an air/fuel mixture to the combustion chamber of the engine. The rotors have semi-cylindrical pockets and protrusions that continuously move air through the supercharger. The unthrottled volume of air delivered by the supercharger depends on the operating speed of the engine that drives the supercharger. The unthrottled volume of air delivered by the supercharger operating at a constant speed and pressure varies little. There are no air flow controls to regulate air flowing into and out of the supercharger.

C. N. Hansen and P. C. Cross in U.S. Pat. No. 8,539,769 disclose an internal combustion engine combined with a variable displacement supercharger operable to provide varying amounts of air to the engine that range selectively from below through above atmospheric pressures responsive to the power requirements of the engine. The supercharger has an air intake and male and female rotors rotated by the engine to move a mass of air from the air intake to the engine. The rotors are located within a housing having an air bypass opening and an air bypass passage in communication with an air passage for directing bypass air to the air intake of the supercharger. A slide assembly is movably mounted on the supercharger housing for movement toward the air intake of the supercharger to change the position of the slide assembly along the length of the rotor, the mass of air directed to the engine and the mass of air flowing back to the air inlet of the supercharger. The slide assembly changes the position of the air bypass opening whereby more of the rotor lengths are effective to increase the mass of air above atmospheric pressure that is directed to the engine. A throttle valve located in the air inlet of the supercharger regulates the air mass flowing into the supercharger below atmospheric pressure to control the power of the engine when boost is not required. A control processor is used to regulate the positions of the slide assembly and throttle valve according to the power requirement of the engine.

T. D. Blackwell in U.S. Pat. No. 4,281,975 discloses a screw compressor with male and female rotors and a slide valve mounted within a cylindrical bore that intersects with the bores accommodating the rotors. Air pressure exerted against the slide valve results in friction and wear between the slide valve and adjacent structures. A cylindrical bore accommodates the slide valve. Anti-friction structures comprising rollers rotatably mounted on the slide valve located in grooves in the side wall of the bore accommodating the slide valve. An alternative anti-friction structure comprises transversely extended arcuate grooves in the surface of a cylindrical bore and anti-friction balls located in the grooves in the bores and grooves in the slide valve.

L. S. Anderson in U.S. Pat. No. 6,227,834 discloses a screw compressor having male and female rotors and an adjustable slide for regulating gas discharge pressure and capacity. The slide has opposite sides having longitudinal grooves. Rollers mounted on the side wall of the bore accommodating the slide are located in the grooves of the slide to prevent the slide from being pressed into engagement with the rotors and to secure the slide against rotational movements. The supercharger of the invention has novel and advantageous structures and functions which increase the operating performance of an internal combustion engine.

SUMMARY OF THE INVENTION

The invention comprises a supercharged internal combustion engine accommodating air that can range selectively from below through above atmospheric pressure according to the operating requirements of the engine. The internal combustion engine is generally a conventional 4-stroke engine capable of using any number of combustible fuels. The supercharged internal combustion engine has increased fuel efficiency over conventional internal combustion engines including turbo-charged engines. The fuel efficiency of the supercharged internal combustion engine is related to the compression ratio in the combustion chambers of the engine. The supercharged internal combustion engine operates at higher and more efficient compression ratios because the density of the retained gas fraction in the combustion chamber is lower at the end of the exhaust stroke. Reduced in-cylinder temperatures at the beginning of the compression stroke help to prevent detonation of the air/fuel mixture and allows for higher compression ratios, which improves fuel efficiency. The supercharger has a shuttle combined with a throttle valve operable to regulate varying amounts of a mass of air to the combustion chambers of the engine that ranges selectively from below atmospheric pressure to above atmospheric pressure according to the power requirement of the engine. The supercharger produces the lowest parasite power losses by minimizing the air pumping work required to meet the power requirement of the engine. The supercharger has a housing with chambers or bores accommodating male and female helical rotors. The housing includes a bypass air passage allowing air to flow from the bores back to an air intake casing attached to the housing. The air intake casing has an air inlet passage in communication with one or more air inlet openings to the bores accommodating the male and female rotors. The air inlet passage of the casing aids the flow of air to the air inlet ends of the rotors and minimizes and reduces turbulence of air flow to the rotors. A throttle valve regulates the flow of atmospheric air into the air inlet passage of the air intake casing. The throttle valve operates between nearly closed to open positions to regulate the amount of the mass of air below atmospheric pressure or near atmospheric pressure flowing to the air intake casing. When the throttle valve is in the open position air is free to flow into the air intake casing allowing the supercharger to increase the pressure of the mass of air discharged by the supercharger above atmospheric pressure. The air inlet passage of the air inlet casing is surrounded with a diverging diffusion body or barrier separated from the casing wall with a peripheral space open to the bypass passage and a peripheral air exit opening in communication with the air inlet passage adjacent the air inlet to the chambers accommodating the rotors. The bypass air and inlet air flowing in the air inlet passages merges and entrains with a minimum of interference resulting in a smooth flow of air through the air inlet casing to the chambers containing the rotors. A wall separates the bores containing the rotors from a section of the bypass passage adjacent the air inlet casing. The wall prevents outward radial movement of air entering into the bores containing the rotors from the air inlet casing and enables full duration suction of air into the entrance or suction section of the supercharger resulting in improved inlet air volumetric efficiency. A pair of longitudinal rails located in the bypass passage provide linear guides for a shuttle that moves to open and close the opening between a chamber containing a rotor and the bypass passage. The shuttle moves to progressively increase or decrease the active length of the rotors to regulate the mass of air above atmospheric pressure directed to the engine. Each rail has outside linear flat surfaces angularly located relative to each other. The rails are secured with fasteners to the housing. Alternatively, the rails can be integral with the housing. Rollers rotatably mounted on the body of the shuttle ride on the outside linear surfaces of the rails during movement of the shuttle on the rails. A servo electric motor rotates a helical screw operatively connected to the shuttle to move the shuttle along the rails to vary the mass of air directed to the combustion chambers of the engine according to the power requirement of the engine. A controller responsive to engine operator input functions to control the shuttle positioning servo motor and throttle valve to regulate the mass of air supplied to the engine and bypass air directed into the bypass passage and back into the air flowing into the supercharger.

DESCRIPTION OF THE DRAWING

FIG. 6 is an enlarged sectional view taken along line 6-6 of FIG. 5;

FIG. 7 is an enlarged sectional view of a modification of FIG. 5 of the air inlet casing;

FIG. 11 is a perspective view of the shuttle, helical screw and power unit operable to rotate the helical screw;

FIG. 12 is an enlarged top plan view of the shuttle of FIG. 11;

FIG. 13 is a front elevational view of FIG. 12;

FIG. 14 is an end elevational view of the right end of FIG. 12;

FIG. 15 is a sectional view taken along line 15-15 of FIG. 12;

FIG. 16 is an enlarged sectional view taken along line 16-16 of FIG. 11;

DESCRIPTION OF THE INVENTION

Figure 1:
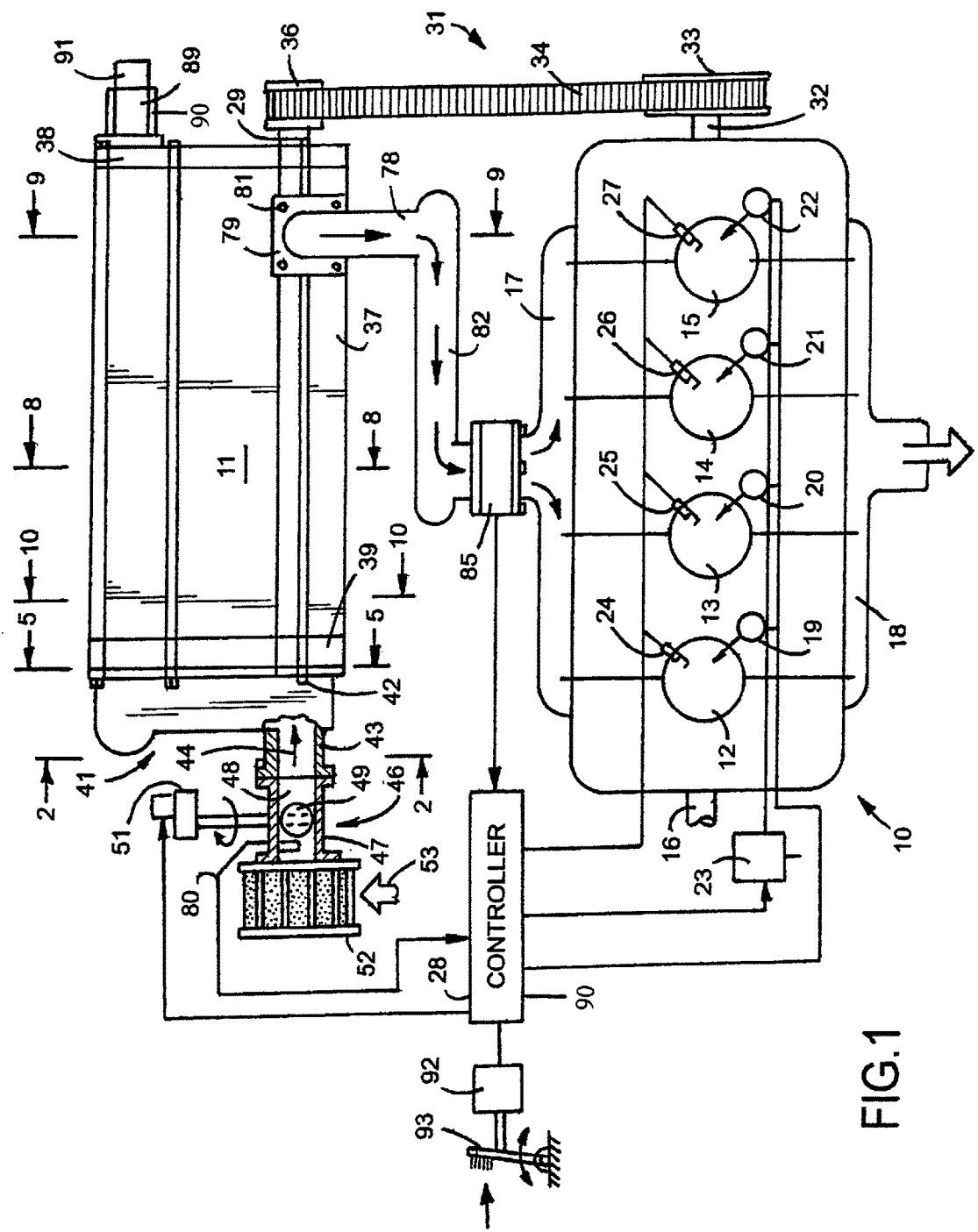
FIG. 1 is a diagram of a supercharged internal combustion engine connected to a supercharger for supplying air to the engine.

A supercharged internal combustion engine 10, shown in FIG. 1, is operatively connected to a supercharger 11 operable to supply a mass of air to the engine. Engine 10 is a conventional internal combustion engine having four cylinders 12, 13, 14 and 15 accommodating pistons (not shown) operable to rotate a drive shaft 16. Engines having any number of cylinders can be operatively connected to supercharger 11 to supply a mass of air to the engines. Engine 10 has an air intake manifold 17 having a manifold chamber in air communication with cylinders 12 to 15. The exhaust gases generated by engine 10 are discharged through an exhaust manifold 18 into an exhaust gas treatment device and atmosphere. Fuel, such as gasoline, is introduced into cylinders 12 to 15 with fuel injectors 19, 20, 21 and 22 connected to a fuel pump 23. Spark igniters 24, 25, 26 and 27 associated with cylinders 12 to 15 are operable to initiate ignition of the air/fuel mixture in cylinders 12 to 15. Each igniter is wired to an electronic signal controller 28 operable to cause igniters 24 to 27 to generate electric sparks or arcs that cause the air/fuel mixture to burn in time sequences. Engine 10 includes internal combustion engines having intake manifolds that operate below atmospheric air pressure and or above atmospheric air pressure. Drive shaft 16 can be coupled to a motor vehicle drive system, a pump, an electric generator or power operated machines.

Supercharger 11 has a power input drive shaft 29 connected to a power transmitting apparatus 31 that drivably connects engine 10 to supercharger 11. Engine 10 has a front drive shaft 32 connected to a pulley or wheel 33. An endless belt 34 trained about pulley 33 transmits engine power to a pulley 36 connected to supercharger drive shaft 29. The operating speed of supercharger 11 is directly related to the operating speed of engine 10. Other power transmitting apparatus including a gear drive or chain can be used to drivably connect engine drive shaft 32 to supercharger drive shaft 29. An electric motor can be used to rotate the rotors of the supercharger.

Supercharger 11 operates to regulate varying amounts of a mass of air to the combustion chambers of cylinders 12 to 15 that ranges selectively from below atmospheric pressure to above atmospheric pressure according to the power requirement of engine 10. In use, supercharger 11 operates with significantly less supercharger shaft power of a conventional screw supercharger for conditions typically dominating the normal motor vehicle driving cycle. Lower parasitic power losses are achieved by supercharger 11 by minimizing the air pumping work required to meet the current power requirement of the engine. Supercharged engine 10 has increased fuel efficiency compared to existing positive displacement supercharged engines and turbocharged engines. The fuel efficiency of engine 10 is closely related to the compression ratio in the combustion chambers of cylinders 12 to 15. Engine 10 operates at a higher and more efficient compression ratio because the density of the retained gas fraction in the combustion chambers of cylinders 12 to 15 at the end of the exhaust stroke is lower than that of a turbocharged engine because of the exhaust back pressure difference. The temperature of the intake gas in the combustion chambers of cylinders 12 to 15 at the beginning of the compression stroke is lower which helps to prevent detonation thereby allowing for a higher compression ratio. The result is improved fuel efficiency of engine 10.

Figure 2:
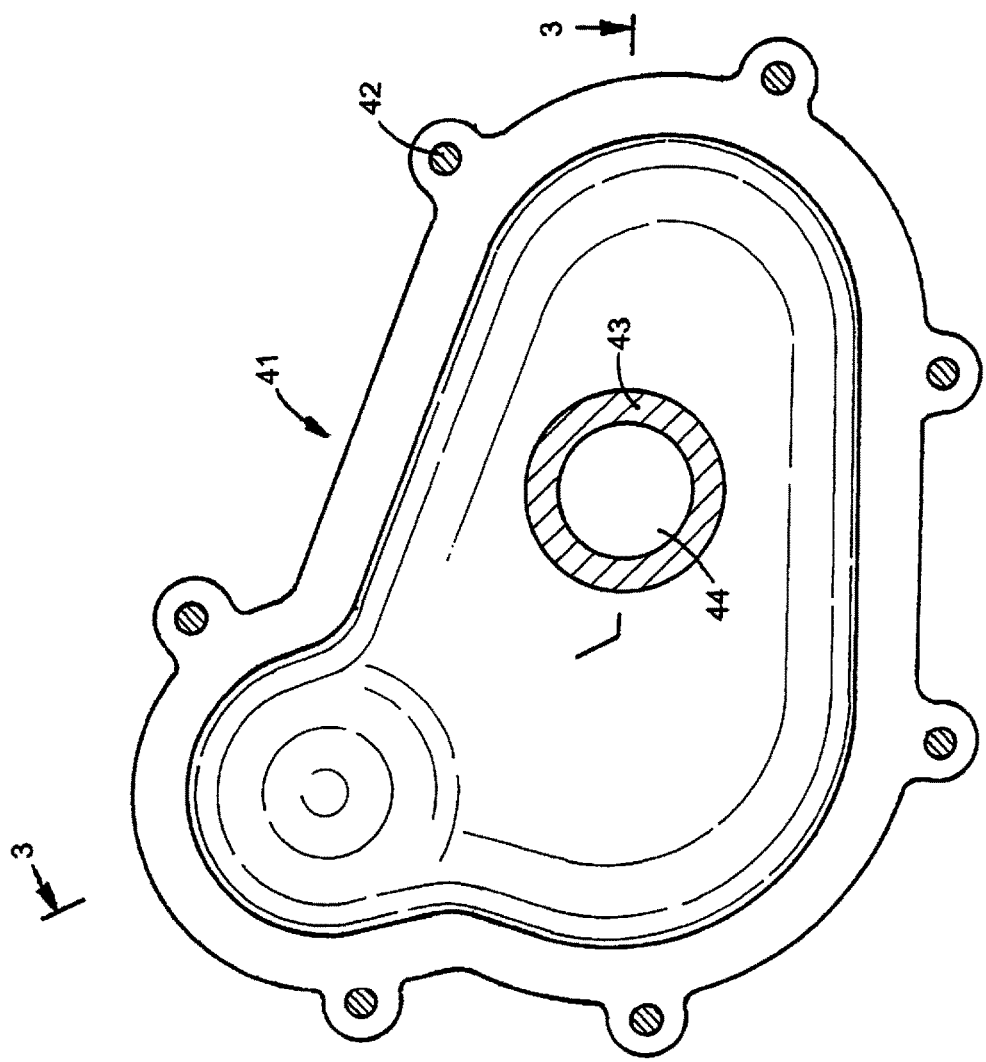
FIG. 2 is an enlarged sectional view taken along line 2-2 of FIG. 1.

Supercharger 11 has a main housing or body 37 with end members 38 and 39 adjacent opposite ends of body 37. An air inlet housing or casing 41 is attached to end member 39 with fasteners 42, shown as bolts or rods extended through end members 39 into threaded holes in body 37. Other fastening structures can be used to assemble end members 38 and 39 and air inlet casing 41 to body 37. Air inlet housing or casing 41 has a tubular extension 43 having an air inlet passage 44 as shown in FIGS. 1 and 2.

A throttle device 46 connected to tubular extension 43 is operable to regulate varying amounts of a mass of air flowing into supercharger 11 thereby regulating varying amounts of a mass of air to the combustion chambers of cylinders 12 to 15 that ranges selectively from below atmospheric pressure to at or near atmospheric pressure according to the power requirement of engine 10. Throttle valve device 46 includes a tubular member 47 having a passage 48 in communication with passage 44. A disk throttle valve 49 is movably mounted on tubular member 47 for movement between open and nearly closed positions. An electric motor driven control unit 51 operatively connected to throttle valve 49 controls the open, partly open and nearly closed positions of throttle valve in response to signals generated by controller 28. An air filter 52 attached to throttle valve device 46 cleans atmospheric air, shown by arrows 53, prior to flowing through passages 48 and 44 into supercharger 11. Other types of airflow control valves can be used to control the flow of air into the supercharger 11.

Figure 3:
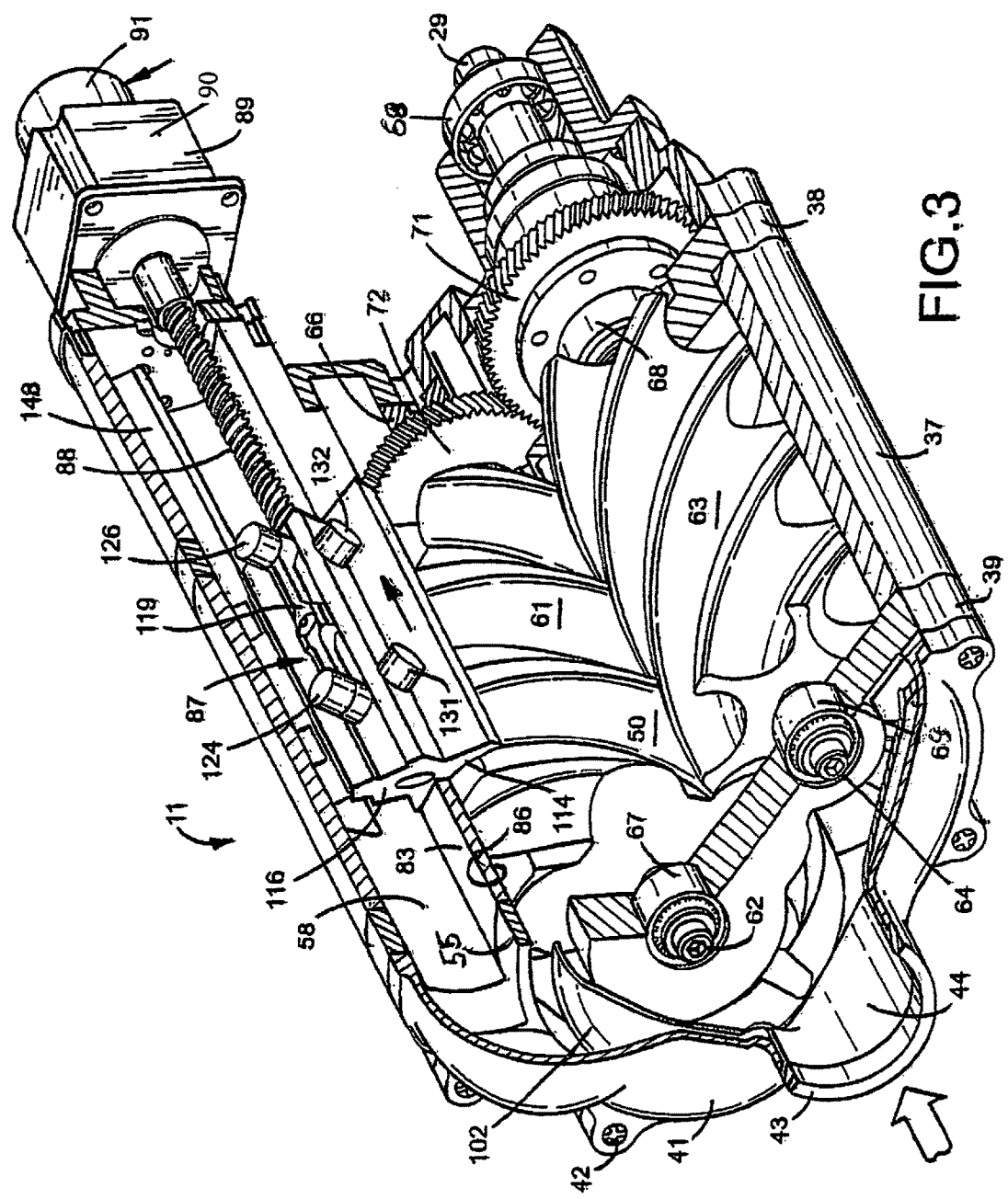
FIG. 3 is a sectional view taken along line 3-3 of FIG. 2 showing the roller shuttle in a closed no air bypass position.
Figure 8:
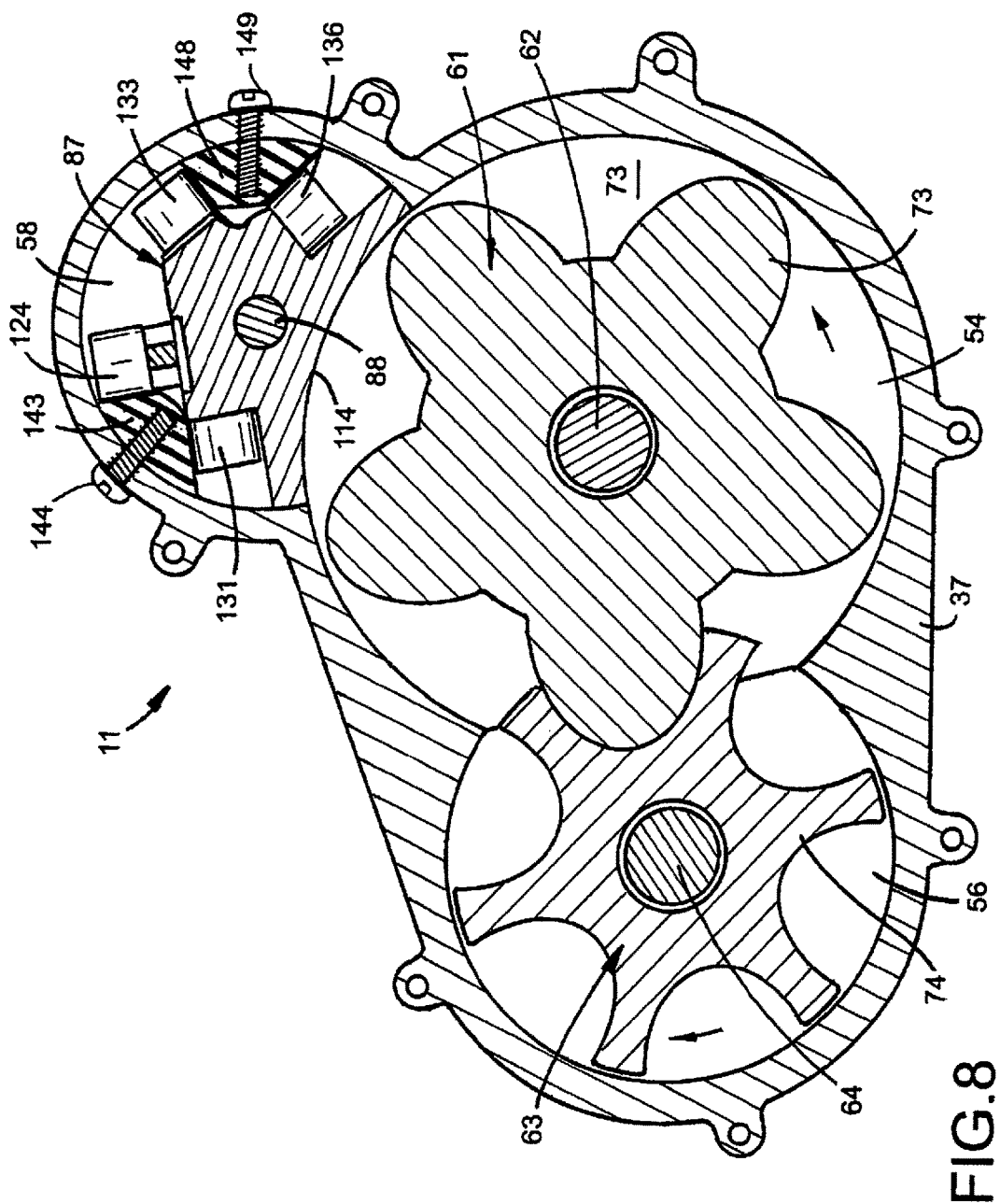
FIG. 8 is an enlarged sectional view taken along line 8-8 of FIG. 1.
Figure 9:
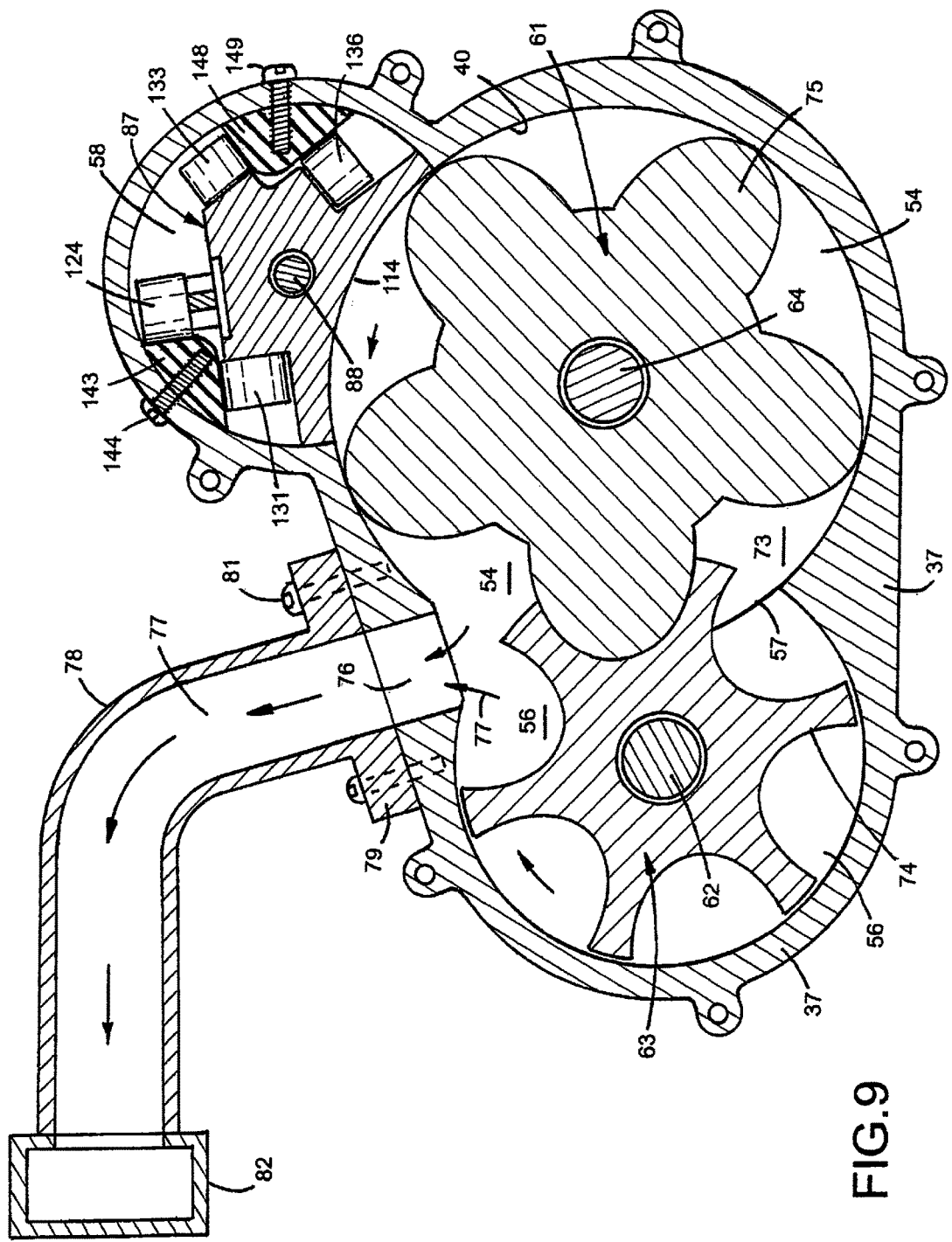
FIG. 9 is an enlarged sectional view taken along line 9-9 of FIG. 1.
Figure 10:
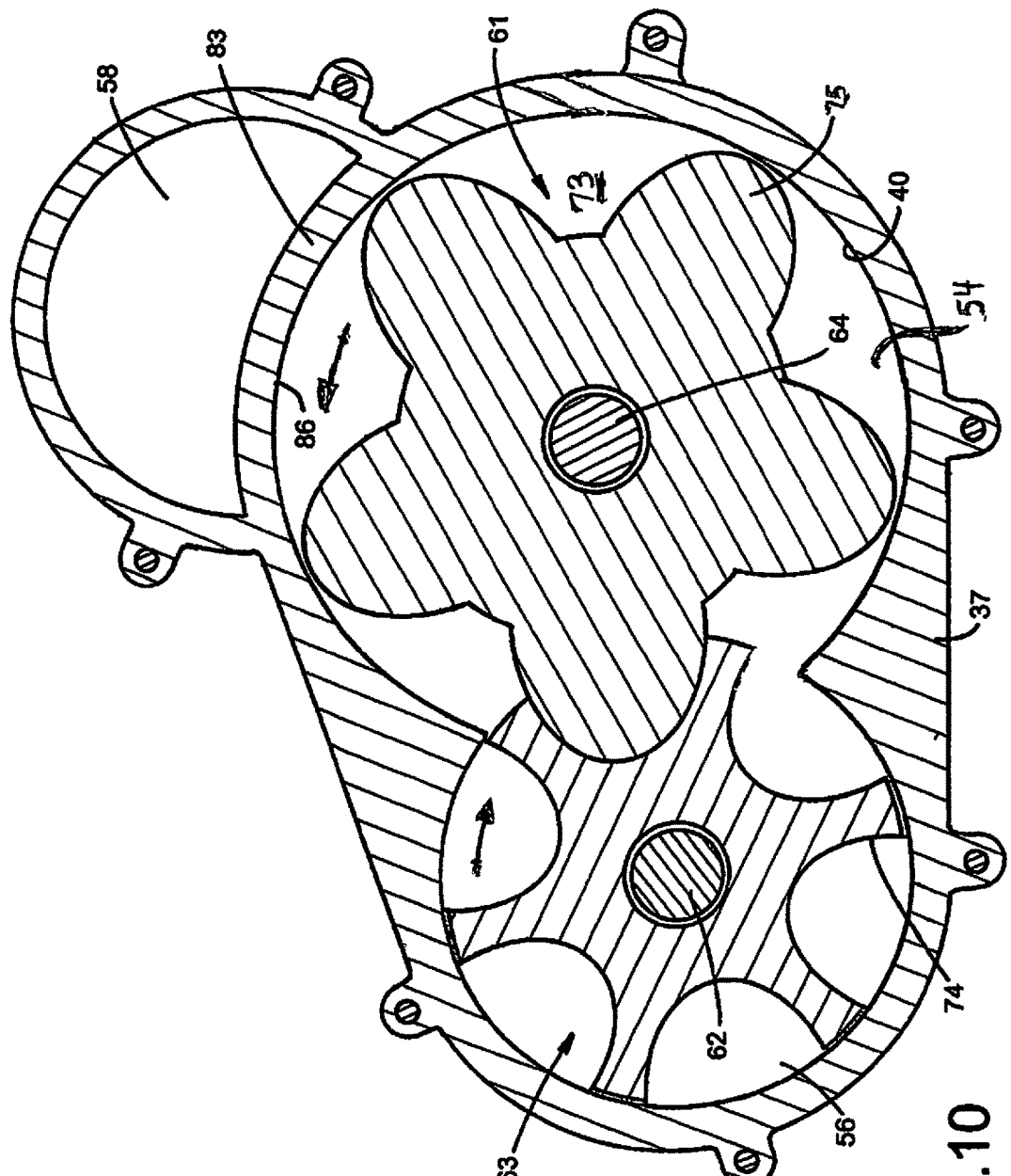
FIG. 10 is an enlarged sectional view taken along line 10-10 of FIG. 1.

Housing 37, as shown in FIGS. 8, 9 and 10, has a first cylindrical chamber or bore 54 open to a second cylindrical chamber or bore 56. Bores 54 and 56 have a common opening 57. The size of opening 57 can vary. Housing 37 also has a passage or space 58 with an arcuate opening 59 open to cylindrical bore 54. This opening has an arc of 50 degrees centered on the axis of rotation of shaft 62 accommodating rotor 61. The arcuate length opening can vary. Male rotor 61 has five helical grooves 73 created by protrusions, lands or vanes 75 circumferentially spaced around the outer perimeter of the rotor. Female rotor 63 has six circumferentially spaced helical pockets, chambers or grooves 74 which mesh with vane 75 of male rotor 61. Each vane 75 has convex shaped outside walls that are complementary to the shapes of the inside walls of grooves 74 of female rotor 63. The sizes, numbers, shapes, helical configurations, and extent of vanes 75 and grooves 74 can vary. As shown in FIG. 3, male rotor 61 is mounted on an axial shaft 62. Opposite ends of shaft 62 accommodate ball or roller bearings 66 and 67 retained on end members 38 and 39. Female rotor 63 is mounted on axial shaft 64. Bearings 68 and 69 support shaft 62 on end members 38 and 39. Shafts 62 and 64 have parallel rotational axes. A drive gear 71 connected to shaft 64 is in driving engagement with a driven gear 72 connected to shaft 62. Drive shaft 29 is connected to drive gear 71 whereby the internal combustion engine 10 connected to shaft 29 with power transmitting apparatus 31, shown in FIG. 1, rotates rotors 61 and 63 in opposite circumferential directions to move air through supercharger 11. As shown in FIG. 9, housing 37 has an air discharge or exit opening 76 open to bores 54 and 56 and a passage 77 in tubular member 78. Tubular member 78 is joined to a base 79 secured with fasteners, shown as bolts, to housing 37. The outer end of tubular member 78 is attached to an intercooler or heat exchanger 82 operable to reduce the temperature of the air flowing from supercharger 11 to an optional air mass flow sensor 80 located in the throttle body 47. Air flow sensor 80 wired to controller 28 provides continuous electric signals to controller 28 corresponding to the air flow and air mass conditions directed into air inlet of casing 41. Other methods and devices may be used to determine or infer air mass flow rate to air inlet of casing 41 utilizing input sensors for intake manifold air temperatures, intake manifold air pressure, throttle position and engine speed, etc. An air pressure sensor 85 interposed between heat exchanger 82 and air intake manifold 17 is wired to controller 28. Air pressure sensor 85 generates air pressure signals that are transmitted to controller 28 which incorporates the air pressure signals in the program that controls supercharger 11.

Returning to FIG. 4, air intake section 50 of chamber 54 is separated with an arcuate wall 83 from passage 58. Wall 83 extends from end member 39 to an air bypass opening 84 between chamber 54 and passage 58. Wall 83 has a concave inside surface 86 that conforms with the inside surface of wall 55 of housing 37 surrounding chamber 54. Wall 83 prevents outward radial movement of air away from rotor 61 and minimizes turbulence of air flow during the suction of the air into supercharger 11. Full duration suction of air in the intake suction section 50 of chamber 54 improves air volumetric efficiency.

Figure 4:
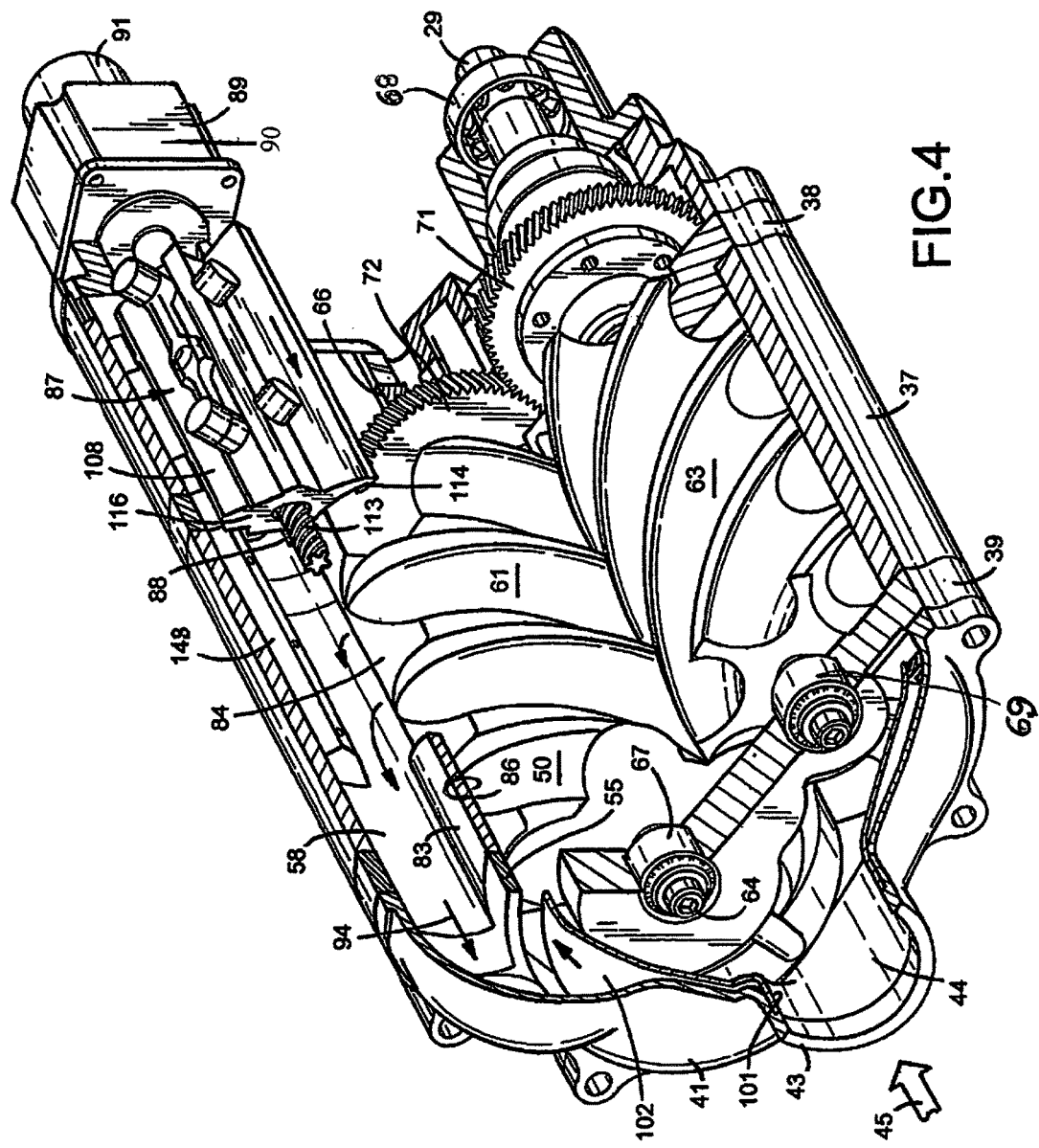
FIG. 4 is a sectional view taken along line 3-3 for FIG. 2 showing the roller shuttle in an open air bypass position.
Figure 5:
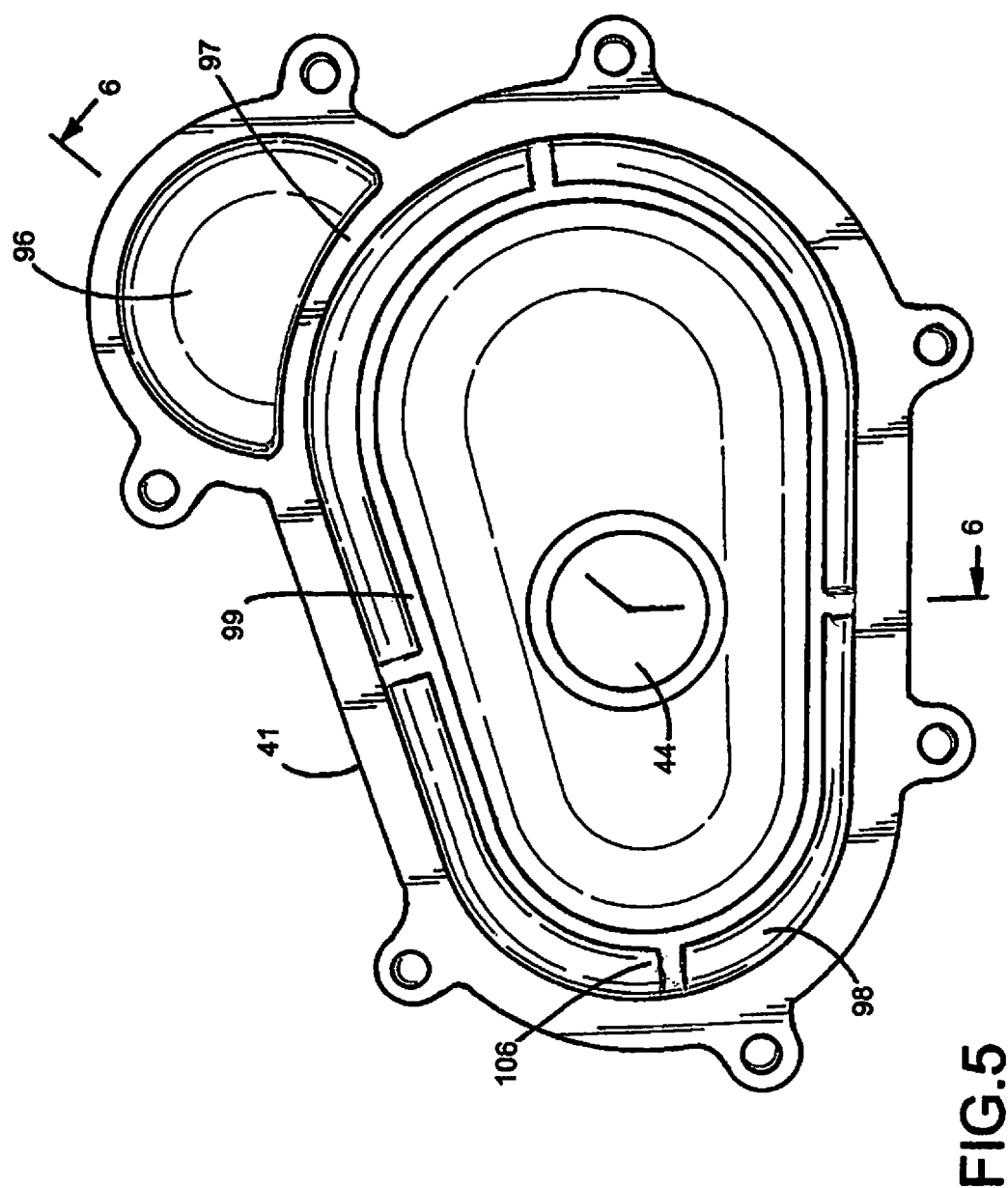
FIG. 5 is an enlarged sectional view taken along line 5-5 of FIG. 1.

A shuttle 87 located in passage 58 moves along the length of passage 58 to regulate the length or size of bypass opening 84. Shuttle 87 moves from a first no air flow position closing the bypass opening, as shown in FIG. 3, to a second air flow position to a maximum bypass opening, as shown in FIG. 4. Shuttle 87 also moves to intermediate positions between the close and maximum open locations to trap or confine in the grooves of the rotors the mass of air moved by supercharger 11 according to the operating requirement of internal combustion engine 10. Shuttle 87 changes the size of air bypass opening 84 exposing more of the rotor lengths being effective to change the mass of air above atmospheric pressure that is directed to the engine. As shown in FIG. 11, an actuator shown as a helical screw 88 rotated with an electric servo motor 89 is operatively connected to shuttle 87 to move shuttle 87 between the close, nearly closed and maximum open locations thereby change bypass opening 84 and the effective air trapping length of the rotors. As shown in FIG. 1, electric servo motor 89 is wired with conductor 90 to controller 28. An angle encoder 91 operatively connected to motor 89 senses the rotation of screw 88 providing controller 28 with data concerning the location of shuttle 87 relative to air bypass opening 84. Controller 28 functions to generate signals which activate electric servo motor 89 to rotate screw 88 to change the location of shuttle 87 relative to bypass opening 84 to regulate the mass of bypass air flowing into passage 58. Shuttle 87 can be linearly moved along rails 143 and 148 between an air flow open and partly open positions and no air flow closed position relative to air bypass opening 84 with actuators including a linear motor, a solenoid, pneumatic cylinder, hydraulic cylinder and a diaphragm or bellows, etc.

An operator control sensor 92 coupled to foot pedal 93 is used to provide controller 28 with operator demand electric signals responsive to movement of foot pedal 93 by the operator of engine 10. When engine 10 is operating at low power levels and more power is demanded, controller 28 instructs motor control unit 51 to further open throttle valve 49 whereby more air flows into supercharger 11 and out of supercharger 11 to engine 10. When throttle valve 49 is wide open and the operator demands more power by pressing foot pedal 93, controller 28 then signals servo motor 89 to progressively move shuttle 87 to increase the effective air trapping length of the rotors thereby increasing the amount of air delivered to engine 10 to increase its power output. If the operator demands further increases in power and shuttle 87 is not yet at its maximum delivery position, controller 28 will continue to advance the shuttle position to increase the quantity of air delivered to engine 10 until a limiting condition is reach such as maximum engine speed or the knock-limited engine intake manifold air pressure, shuttle position, or mass airflow amount. Controller 28 can be pre-programmed with known limit values of knock-limited engine intake manifold air pressure, shuttle position, or mass airflow amount for each engine speed. If the operator demands more power and such limits have been reached, controller 28 will signal the vehicle transmission to downshift the gear ratio to the drive wheels to allow operation at a higher engine speed that will produce more power. Controller 28 continuously positions throttle valve 49 and/or shuttle 87 to the positions that provide the required amount of air to meet the demanded power at all engine speeds without exceeding the knock-limited intake manifold pressure of engine 10.

Returning to FIGS. 4, 5, 6 and 7, bypass air passage 58 open to a passage 96 in air inlet casing 41 receives bypass air, shown by arrow 94. Wall 55 and wall 83 direct air into passage 96 and peripheral space 98 between air inlet casing 41 and a barrier or air entrainment guide member 99. Member 99 has a tubular neck 101 telescoped into and attached to tubular extension 43. Neck 101 is joined to a diverging diffusion body 102 having an open end 103 spaced from the inner end 104 of air inlet casing 41. A plurality of bosses 106 secure body 102 to air inlet casing 41 and maintain the peripheral space 98 between air inlet casing 41 and body 102. Bypass air 94 flows from passage 58 into passage 96 and peripheral space 98 around body 102. A peripheral column of bypass air, shown by arrows 107, merges and interfuses with atmospheric air, shown by arrows 45, before air enters the suction section 50 of bores 54 and 56 accommodating rotors 61 and 63. The air flows of bypass air and atmospheric air are aligned and entrained in the same direction. The bypass air, shown by arrows 107, has a minimum of interference with the flow of atmospheric air, shown by arrows 45, in supercharger 11. As shown in FIG. 3, when shuttle 87 is in a location closing the air bypass opening 84 air does not flow in passages 58 and 96 and through peripheral space 98 and into the suction section of supercharger 11. All of the atmospheric air, shown by arrows 45, flows uninterrupted through air inlet casing 41 into bores 54 and 56 of supercharger 11.

A modification of air inlet housing 41 and air diverter or member 102 is shown in FIG. 7. The structures of the air inlet housing shown in FIG. 7 have the same reference numbers as FIG. 6 with a suffix A. Body 102A is joined to housing extension 43A whereby air inlet housing 41A and body 102A is a one-piece structure.

Shuttle 87, shown in FIGS. 11 to 15, has a carriage or body 108 attached to a threaded member 109 with fasteners 111, such as bolts. Helical screw 88 is threaded into threaded member 109 whereby rotation of helical screw 88 in selected clockwise or counterclockwise directions, shown by arrows 112, linearly moves shuttle 87 in passage 58 to alter the size of air bypass opening 84 to change the effective air trapping length of the rotors, as shown in FIGS. 3 and 4. Body 108 has a center longitudinal hole 113 accommodating helical screw 88. Hole 113 extends through the length of body 108 allowing body 108 to linearly move relative to the length of helical screw 88. Body 108 includes a concave wall 114 having an arcuate configuration concentric with the circumferential curvature of the peripheral edges of vanes 73 of rotor 61. The forward face or end 116 of wall 114 is inclined in a forward direction at an angle of about 30 degrees relative to the longitudinal extent of wall 114. Other inclined angles can be used for the forward end 116 of wall 114. The inclined end 116 is generally complementary to the helical angle of the vanes of rotor 61 and facilitates the flow of bypass air from rotor 61 into air bypass passage 58. Body 108 has a top surface 117 with a longitudinal groove 118 extended along the length of surface 117. A spring beam 119 has a middle section 120 attached with a fastener 121, shown as a bolt, to body 108. Middle section 120 of beam 119 has side edges contacting the opposite edges of body 108 of groove 118 to prevent turning or rotation of beam 119 on body 108. Beam 119 has spring arms 122 and 123 joined to center section 120. Arms 122 and 123 are equal in length and extend in opposite longitudinal directions from center section 120. Upwardly extended cylindrical rollers 124 and 126 are attached to the outer ends of arms 122 and 123. As shown in FIGS. 14 and 15, body 108 has shoulders 127, 128 and 129. Cylindrical rollers 131 and 132 are rotatably mounted on shoulder 127. The axes of rotation of rollers 131 and 132 are 90 degrees from the axes of rotation of rollers 124 and 126. The angular relationship between the axes of rotation of rollers 124, 126 and 131, 132 can vary. Cylindrical rollers 133 and 134 are rotatably mounted on shoulder 128. Cylindrical rollers 136 and 137 are rotatably mounted on shoulder 129. The axes of rotation of rollers 133 and 134 and rollers 136 and 137 are 90 degrees apart. Other angular relationships between the axes of rotation of rollers 133, 134 and 136, 137 can be used.

Rollers 124, 126, 131-134 and 136, 137 are the same size with continuous outer cylindrical surfaces. FIG. 16 shows roller 136 having an inverted cap-shaped casing 138 retained on a needle bearing 139 with a washer 141. A bolt 142 extended through needle bearing 139 is threaded into shoulder 127 of body 108. Other types of rollers can be used with body 108 to rotatably support shuttle 87 in air bypass passage 58.

Figure 17:
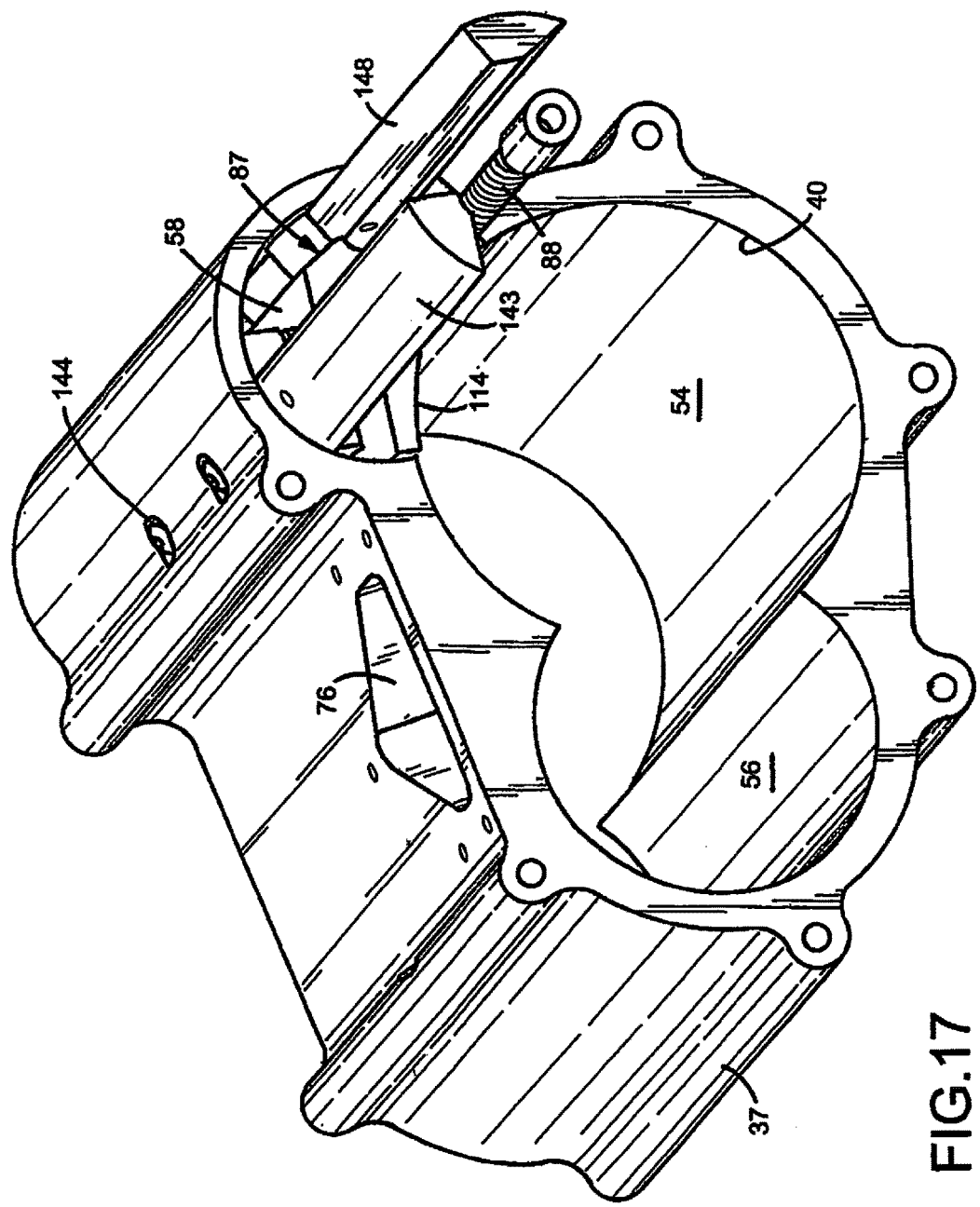
FIG. 17 is an enlarged perspective view of the air discharge end section of the supercharger of FIG. 1.
Figure 18:
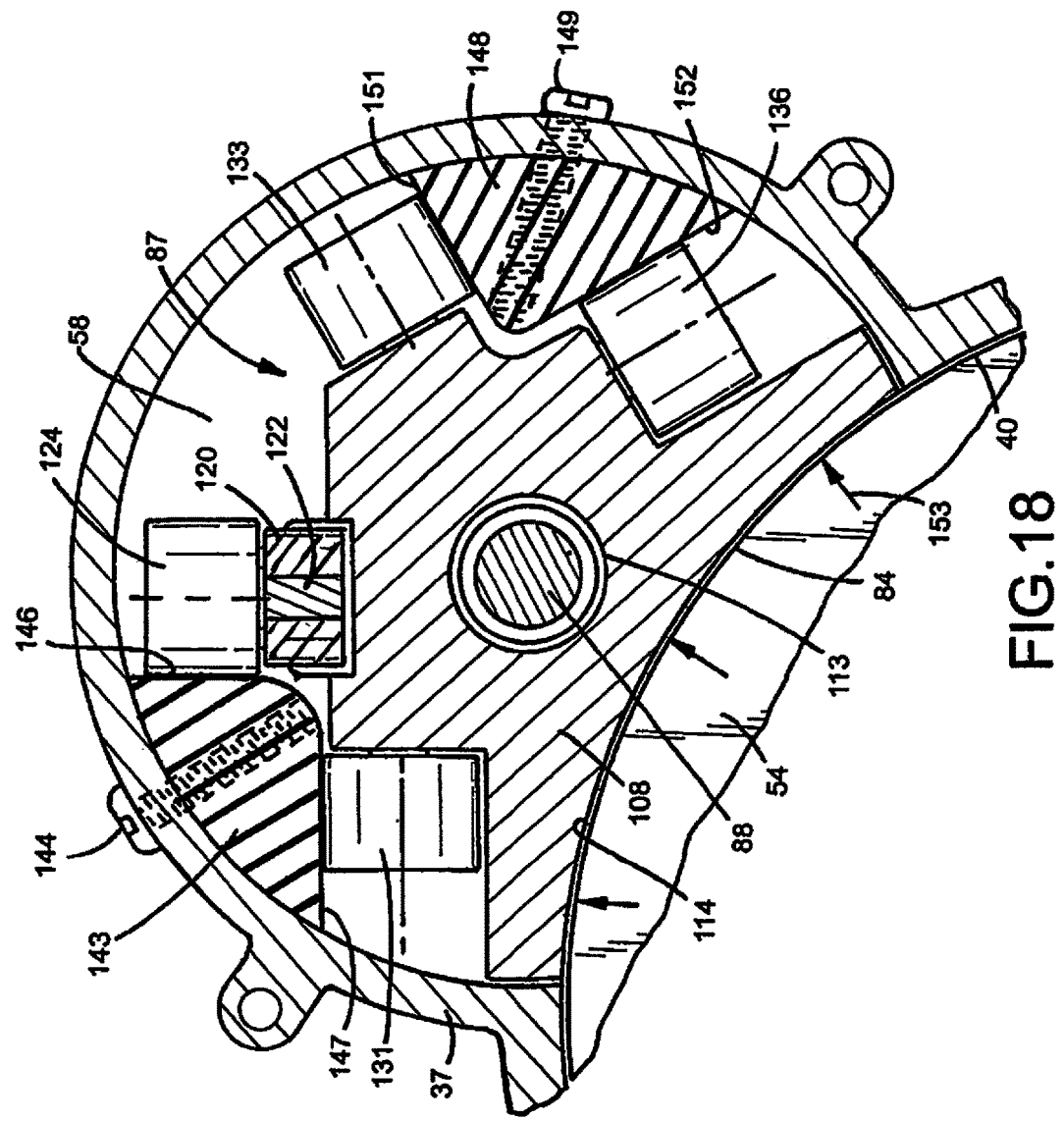
FIG. 18 is an enlarged sectional view of the shuttle and shuttle housing portion of FIG. 8.

As shown in FIGS. 17 and 18, a pair of rails or tracks 143 and 148 located in passage 58 cooperate with shuttle 87 for low friction linearly guiding shuttle 87 along rails 143 and 148 for rapid movement between the air bypass open and closed positions of shuttle 87. Fasteners 144 and 149 secure rails 143 and 148 to the inside wall surrounding passage 58 of housing 37. Rails 143 and 148 are circumferentially spaced 135 degrees from each other. The circumferential distance between rails 143 and 148 can vary. Rail 143 has a linear flat first side surface 146 and a linear second flat side surface 147. Surfaces 146 and 147 extend the length of rail 143 and are in planes located 90 degrees from each other. Surfaces 146 and 147 can have different angle relationships. Second rail 148 has a linear flat first side surface 151 and a linear flat second side surface 152. Surfaces 151 and 152 extend the length of rail 148 and are disposed 90 degrees from each other. Other angular relationships between surfaces 151 and 152 can be used. Rollers 124, 131, 126 and 132 ride on rail 143. Rollers 133, 136, 134 and 137 ride on rail 148. The rollers engage linear surfaces 146, 147 and 151, 152 of rails 143 and 148 to locate wall 114 concentric with the cylindrical inside wall 40 of housing 37. The axes of rotation of rollers 124 and 131 are parallel to flat surfaces 146 and 147 of rail 143. The axes of rotation of rollers 133 and 136, shown in broken lines in FIG. 18, are parallel to flat surfaces 151 and 152 of rail 148. The rollers have low friction contact with rails 143 and 148 which allows shuttle 87 to be rapidly moved with a minimum of force of servo motor 89.

Returning to FIGS. 12, 13 and 18, shuttle 87 is subjected to air pressure, shown by arrows 153 in FIG. 18, generated in chamber 54 by the rotation of rotors 61 and 63. The air pressure on wall 114 of shuttle 87 forces rollers 131 and 132 into contact with linear flat surface 147 of rail 143. The air pressure on wall 114 also forces rollers 136 and 137 into contact with linear flat surface 152 of rail 148. Rollers 131, 132 on rail 143 and rollers 136, 137 on rail 148 prevent outward or radial movement of shuttle 87 relative to housing 37 and rotor 61 and prevents turning or rotation of shuttle 87 in passage 58. Rollers 124 and 126 are biased into contact with linear flat surface 146 of rail 143. Arms 122 and 123 are flexed to retain rollers 124 and 126 in contact with linear flat surface 146 of rail 143. Spring beam 119 applies a biasing force on rollers 124 and 126 that compensates for transient pressure reversals, manufacturing tolerances and thermal growth differentials of housing 37 and of shuttle 87.

Figure 19:
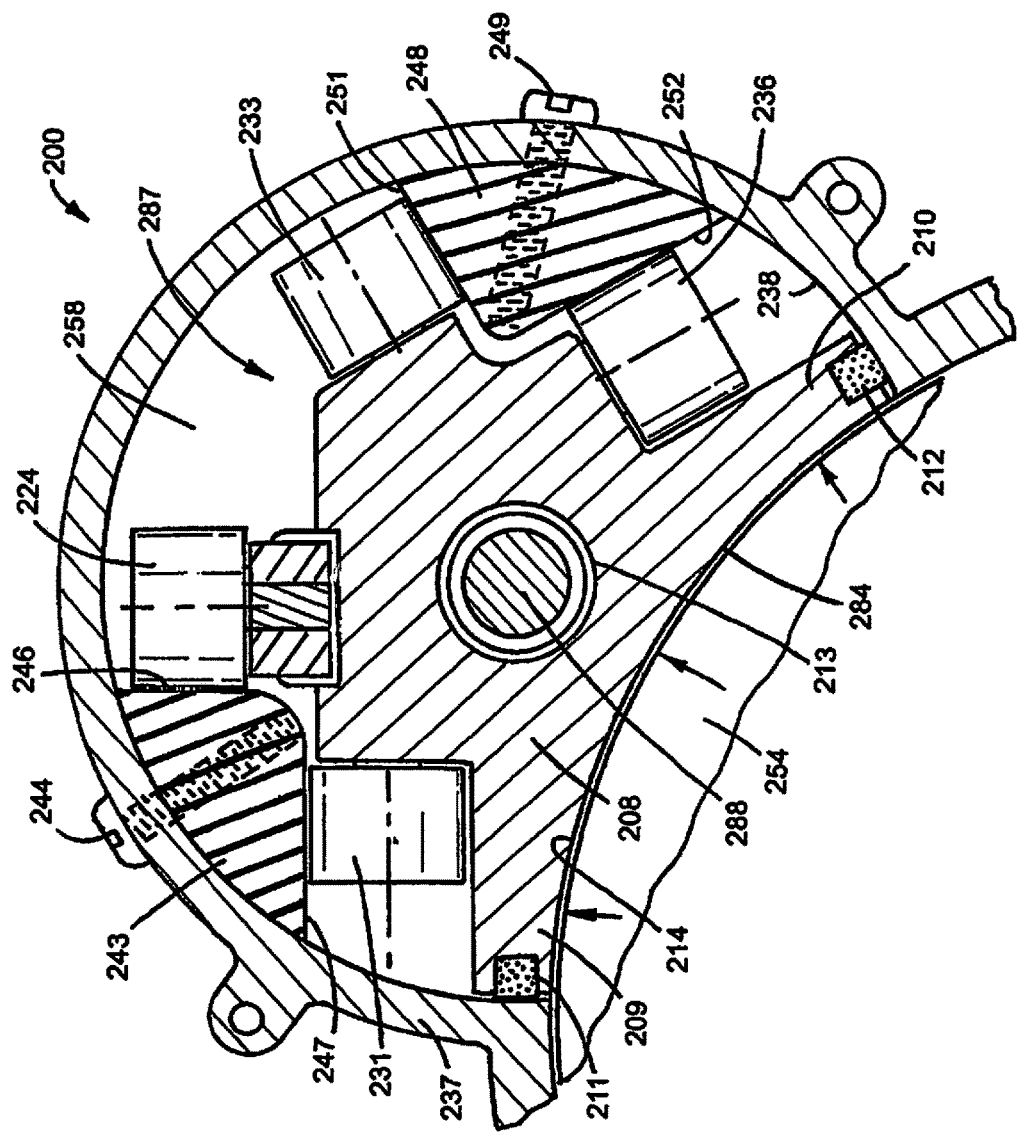
FIG. 19 is an enlarged sectional view of a first modification of the shuttle and shuttle housing portion of FIG. 8.

A second embodiment 200 of shuttle 287, shown in FIG. 19, is located in air bypass passage 258 of housing 237. Rails 243 and 248 are secured to housing 237 with fasteners 244 and 249. Rail 243 has inwardly converging linear flat surfaces 246 and 247. Rollers 224 and 231 rotatably mounted on body 208 ride on surfaces 246 and 247. Rail 248 has inwardly converging linear flat surfaces 251 and 252. Rollers 233 and 236 rotatably mounted on body 208 ride on surfaces 251 and 252. Shuttle 287 is moved along rails 243 and 248 with a helical screw 288 driven by a servo electric motor. Screw 288 extends through an axial hole 213 through body 208. The drive mechanism for shuttle 287 comprises a helical screw, a nut and a servo electric motor assembly as shown in FIG. 11. Body 208 has a concave surface 214 closing the air bypass opening 284 between chamber 254 and air bypass passage 258. The opposite linear side portions 209 and 210 have linear longitudinal grooves accommodating linear seals 211 and 212. Seals 211 and 212 are elongated plastic members. Other materials including metal and composite materials can be used for seals 211 and 212. The outer surfaces of seals 211 and 212 located in sliding contact with the inside surface 238 of housing 237 prevent air from flowing from chamber 254 around shuttle 287 into bypass passage 258.

Figure 20:
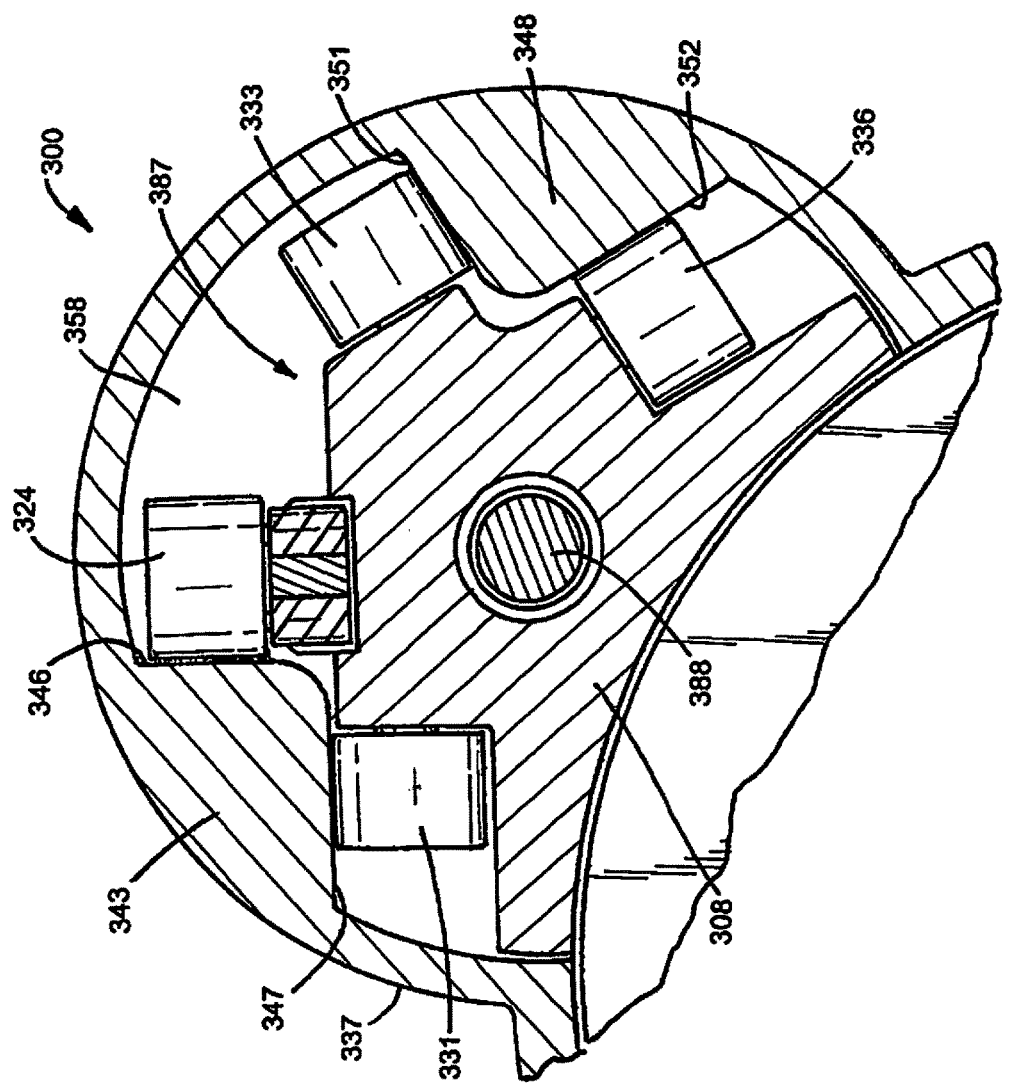
FIG. 20 is an enlarged sectional view of a second modification of the shuttle and shuttle housing portion of FIG. 8.

A third embodiment 300 of shuttle 387 and housing 337, shown in FIG. 20, illustrates rails 343 and 348 integral with housing 337. Rail 343 has inward converging linear flat surfaces 346 and 347. Rail 348 has inward converging linear flat surfaces 351 and 352. Rollers 324 and 331 rotatably mounted on body 308 of shuttle 387 ride on surfaces 346 and 347 of rail 343 and rollers 333 and 336 ride on surfaces 351 and 352 of rail 348 during movement of shuttle 387 in air bypass passage 358. An elongated screw 388 driven by a servo electric motor moves shuttle 387 along passage 358 between air bypass open and closed locations to control the mass of air directed to the internal combustion engine according to the power requirements of the engine.

Figure 21:
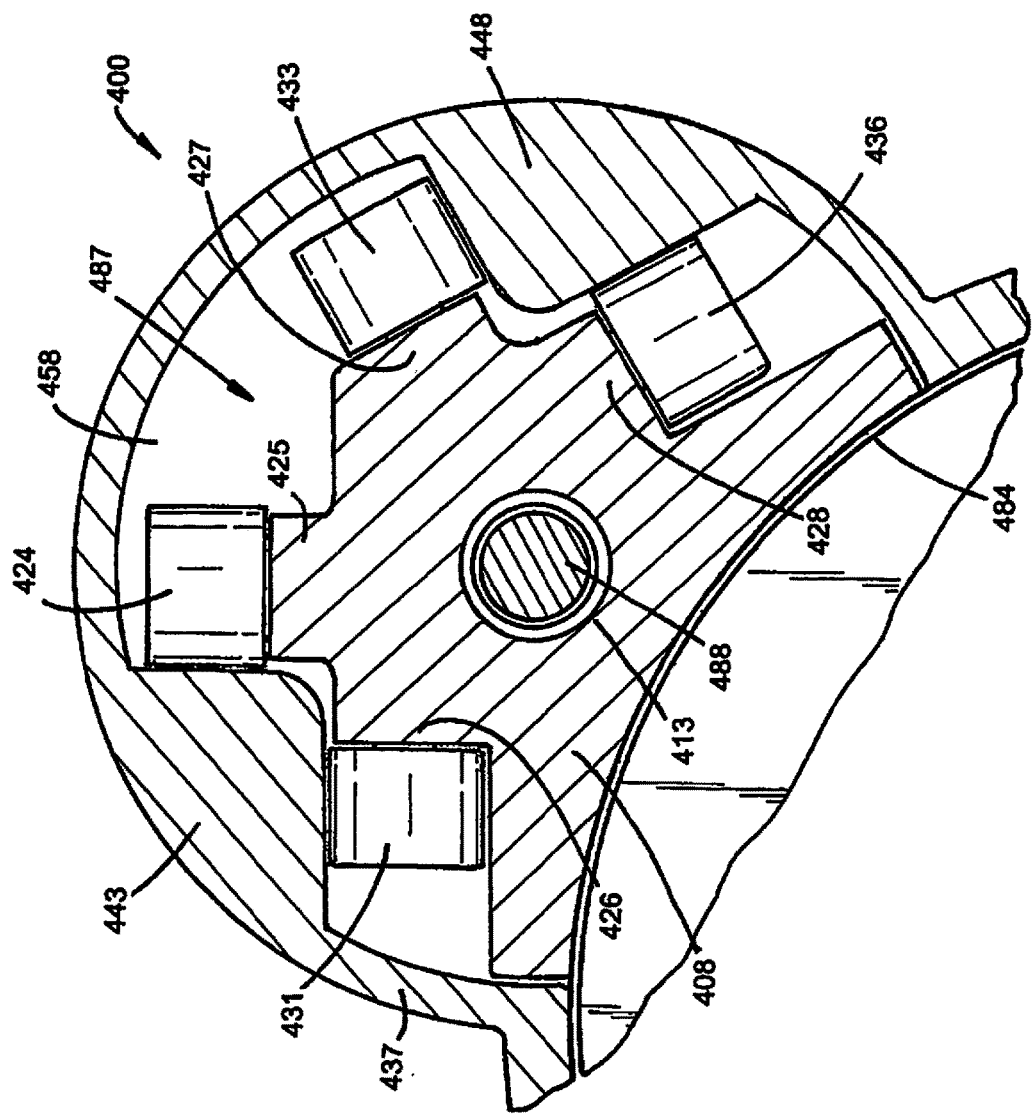
FIG. 21 is an enlarged sectional view of a third modification of the shuttle and shuttle housing portion of FIG. 8.
Figure 24:
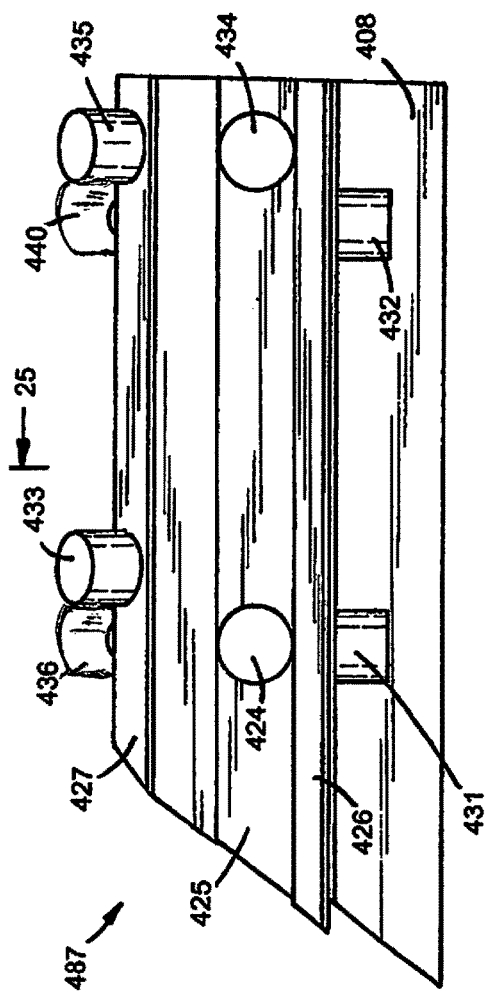
FIG. 24 is a top plan view of the shuttle shown in FIG. 21.
Figure 25:
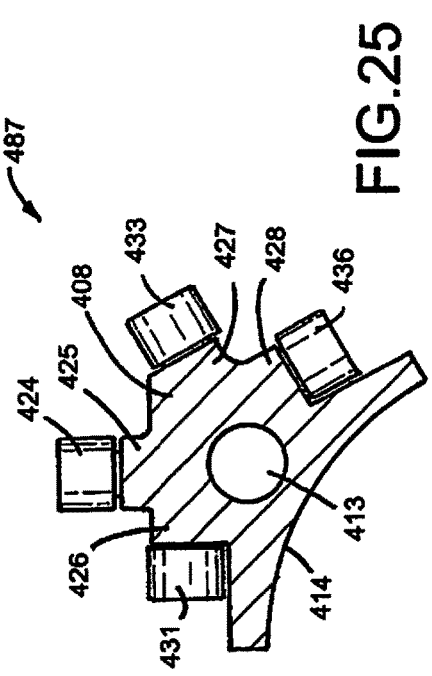
FIG. 25 is a sectional view taken along line 25-25 of FIG. 24.

A fourth embodiment 400 of shuttle 487 and housing 437, shown in FIG. 21, has shuttle 487 located in an air bypass passage 458. Shuttle 487 has a body 408 with an axial hole 413 accommodating an elongated helical screw 488 driveably connected to a servo electric motor to move shuttle 487 along bypass passage 458. Shuttle body 408 has linear shoulders 425, 426, 427 and 428 rotatably supporting rollers 424, 431, 433 and 436. Rollers 424 and 431 ride on rail 443 and rollers 433 and 436 ride on rail 448 during movement of shuttle 487 along passage 458 between air bypass open and closed locations to control the mass of air directed to the internal combustion engine according to the power requirements of the engine. As shown in FIGS. 24 and 25, shuttle 487 has additional rollers 432 and 434 that ride on rail 443 and rollers 435 and 440 that ride on rail 448.

Figure 22:
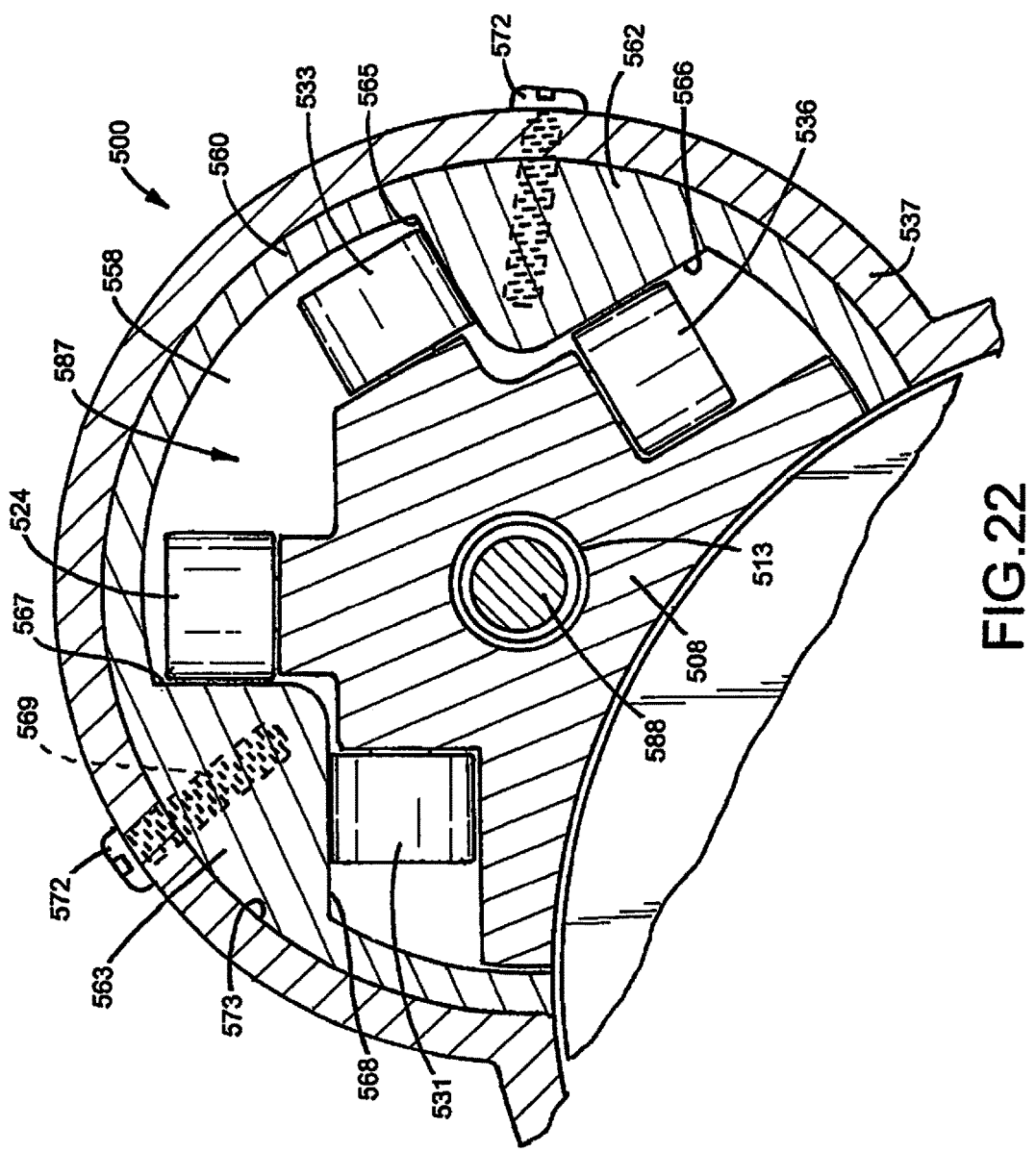
FIG. 22 is an enlarged sectional view of a fourth modification of the shuttle and shuttle housing portion of FIG. 8.
Figure 23:
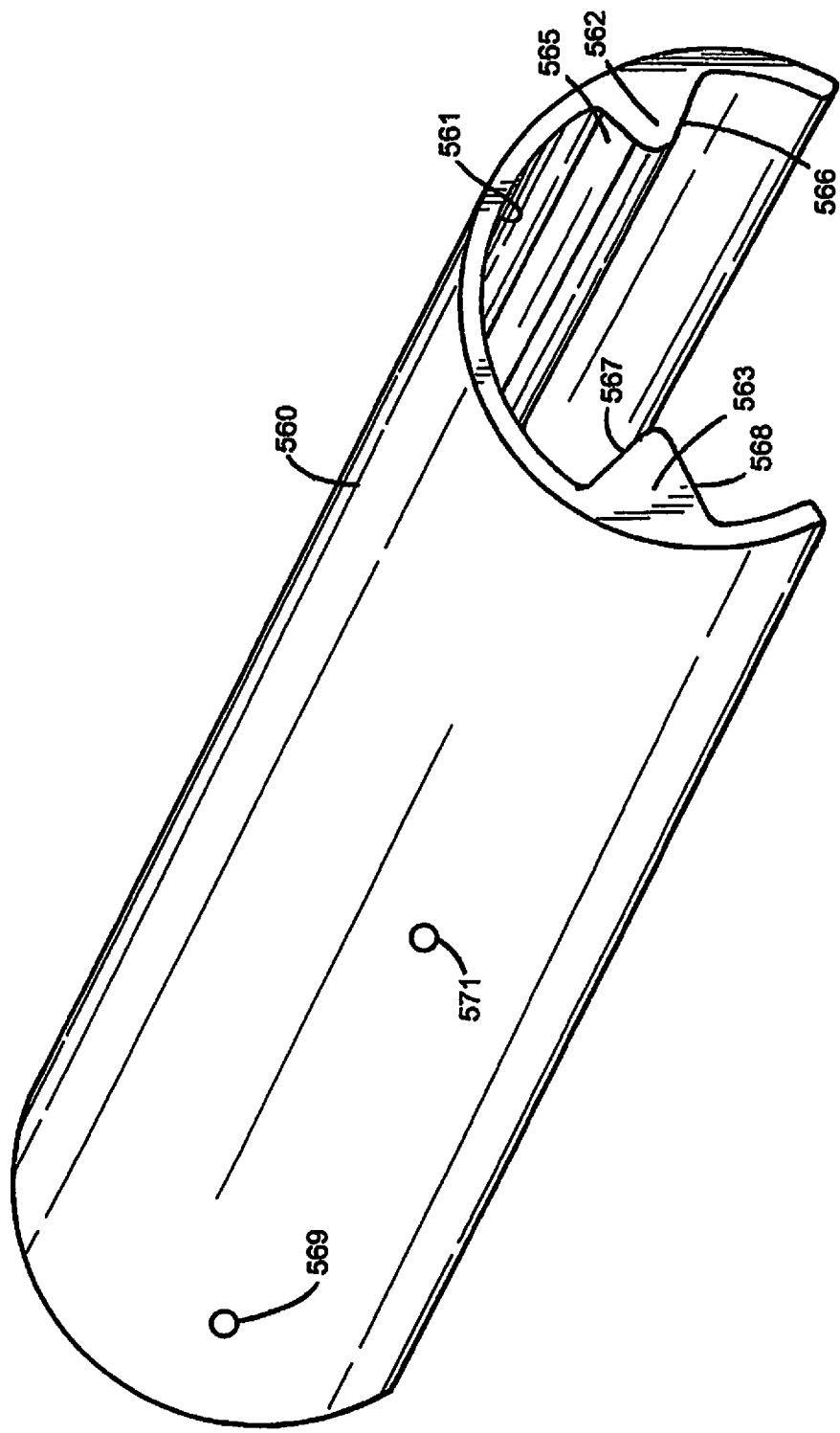
FIG. 23 is a perspective view of the semi-circular sleeve with rails shown in FIG. 22.

A fifth embodiment 500 of the shuttle and housing accommodating the shuttle, shown in FIGS. 22 and 23, has a shuttle 587 located in an elongated air passage 558 in a semi-cylindrical sleeve 560. Passage 558 is an air bypass passage open to a rotor chamber and air inlet casing. Sleeve 560 has an inside semi-cylindrical surface 561. Rails 562 and 563 projected inwardly from surface 561 into passage 558 are circumferentially spaced 135 degrees from each other. Other circumferential spacing between rails 562 and 563 can be used to support shuttle 587 on sleeve 560. Rail 562 has inward converging flat linear surfaces 565 and 566 extended along the length of sleeve 560. Rail 563 has inward converging surfaces 567 and 568 extended along the length of sleeve 560. As shown in FIG. 22, sleeve 560 is located within housing 537. The outside wall of sleeve 560 is in surface contact with the inside wall 573. Fasteners 572, shown as bolts, threaded into holes 569 and 571 secure sleeve 560 to housing 537. Rollers 524 and 531 rotatably mounted on shuttle body 508 ride on rail surfaces 567 and 568 and rollers 533 and 536 ride on rail surfaces 565 and 566 during movement of shuttle 587 along passage 558. Body 508 has an axial hole 513 accommodating a helical screw 588. Screw 588 is operatively connected to a servo motor which rotates screw 588 causing shuttle 587 to move along passage 558. The drive mechanism for shuttle 587 comprises a helical screw, a nut, and a servo electric motor assembly, as shown in FIG. 11.

The supercharger has been shown and described with reference to preferred embodiments of the air intake casing and shuttle for controlling the mass of air directed to an internal combustion engine. Modifications of the air compressor, supercharger, air mass flow controls, shuttle, and shuttle drive mechanisms can be made by persons skilled in the art without departing from the invention.

The invention claimed is:

1. An air compressor operable to generate a mass of air comprising:
a housing including:
a bore providing a pair of parallel chambers;
an air mass inlet for allowing an inlet air mass to flow into the chambers;
an air mass outlet for allowing a compressed first air mass to flow out of the chambers;
an air mass bypass passage open to a low air pressure location for allowing an uncompressed second air mass to flow out of the chambers to the low air pressure location;
an air mass bypass opening in communication with the air mass bypass passage and one of said chambers;
a pair of screw rotors having parallel axes of rotation located in the chambers;
members rotatably mounting the pair of screw rotors on the housing for rotation to move the compressed first air mass from the air mass inlet to the air mass outlet and move the uncompressed second air mass to the air mass bypass passage and low air pressure location;
a shuttle located in the air mass bypass passage moveable parallel to the axes of the pair of screw rotors relative to the air mass bypass opening for selectively opening, partly opening and closing the air mass bypass opening to vary the uncompressed second air mass flowing through the air mass bypass opening to the low air pressure location and the compressed first air mass discharged out of the air mass outlet of the housing;
a pair of rails located in the air mass bypass passage, said pair of rails being joined to the housing and extended parallel to the axes of rotation of the pair of screw rotors;
said shuttle having a body located adjacent one of the pair of screw rotors adapted to be moved to selectively open and close the air mass bypass opening to vary the compressed first air mass discharged from the air mass outlet and the uncompressed second air mass flowing to the air mass bypass passage;
a plurality of rollers rotatably mounted on the body of the shuttle engageable with the pair of rails to support the shuttle on the rails for movement along the pair of rails to selectively open and close the air mass bypass opening to vary the flow of the compressed first air mass to the air mass outlet and the uncompressed second air mass flowing to the air mass bypass passage;
an actuator operatively connected to the shuttle for moving the shuttle along the pair of rails to selectively open and close the air mass bypass opening to the air mass bypass passage whereby when the air mass bypass opening is open or partly open the uncompressed second air mass flows through the open or partly open air mass bypass opening to the low air pressure location and the compressed first air mass flows through the air mass outlet of the housing and when the air mass bypass opening is closed all of the compressed air mass flows through the air mass outlet of the housing.

2. The air compressor of claim 1 wherein:
the pair of rails are integral with said housing.

3. The air compressor of claim 1 including:
fasteners cooperating with the rails and housing for securing the rails to the housing.

4. The air compressor of claim 1 wherein:
each of the rails includes a linear first surface and a linear second surface angularly disposed relative to each other located in the air mass bypass passage;
said plurality of rollers having first rollers engageable with the linear first surface of the rails and second rollers engageable with the linear second surface of the rails.

5. The air compressor of claim 1 including:
a wall joined to the housing located adjacent the air mass inlet and the one of said pair of screw rotors;
said wall being extended from the air mass inlet to the air mass bypass opening for preventing an air mass from flowing into the air mass bypass passage before the uncompressed second air mass flows through the air mass bypass opening to the low air pressure location.

6. The air compressor of claim 1 wherein:
the air mass bypass opening extends parallel to the axes of rotation of the pair of screw rotors.

7. The air compressor of claim 1 wherein:
the actuator comprises:
an actuator member having threads secured to the body of the shuttle;
an elongated screw operatively engageable with the threads of the actuator member;
a motor drivably connected to the elongated screw operable to selectively rotate the elongated screw in opposite rotational directions thereby selectively move the shuttle to open and close the air mass bypass opening.

8. An air compressor operable to generate a mass of air comprising:
a housing including:
a bore providing a pair of parallel chambers;
an air inlet casing having an air mass inlet for allowing an inlet air mass to flow into the chambers;
an air mass outlet for allowing a compressed first air mass to flow out of the chambers;
an air mass bypass passage open to the air inlet casing for allowing an uncompressed second air mass to flow out of the chambers to the air inlet casing;
an air mass bypass opening in communication with the air mass bypass passage and one of said chambers;
a pair of screw rotors having parallel axes of rotation located in the chambers;
members rotatably mounting the pair of screw rotors on the housing for rotation to move the compressed first air mass from the air mass inlet to the air mass outlet and move the uncompressed second air mass to the air mass bypass passage and air inlet casing;
a shuttle located in the air mass bypass passage movable parallel to the axes of the pair of screw rotors relative to the air mass bypass opening for selectively opening, partly opening and closing the air mass bypass opening to vary the uncompressed second air mass flowing through the air mass bypass opening to the air inlet casing and the compressed first air mass discharged out of the air mass outlet of the housing;
said air inlet casing having an air mass inlet passage and an air mass outlet passage, said air mass outlet passage being in communication with the chambers of the housing whereby the inlet air mass flows through the air mass inlet passage and air mass outlet passage to the chambers of the housing;
an annular body connected to the air inlet casing and located inwardly within the air inlet casing providing an annular space between the air inlet casing and the annular body;
said air mass bypass opening being open to the annular space whereby the uncompressed second air mass in the air mass bypass passage flows into the annular space between the air inlet casing and annular body;

said air inlet casing and annular body having an air mass discharge opening to allow the second uncompressed air mass in the annular space between the air inlet casing and annular body to entrain and flow with the inlet air mass to the chambers of the housing;

an actuator operatively connected to the shuttle for moving the shuttle in the air mass bypass passage to selectively open and close the air mass bypass opening to the air mass bypass passage whereby when the air mass bypass opening is open or partly open the uncompressed second air mass flows through the open or partly open air mass bypass opening to the annular space between the air inlet casing and annular body and the compressed first air mass flows through the air mass outlet of the housing and when the air mass bypass opening is closed all of the compressed air mass flows through the air mass outlet of the housing.

9. The air compressor of claim 8 including:

a wall joined to the housing located adjacent the air mass inlet and the one of said rotors;

said wall being extended from the air inlet casing to the air mass bypass opening for preventing the second uncompressed air mass from flowing into the air mass bypass passage before the second uncompressed air mass flows through the air mass bypass opening to the annular space between the air inlet casing and annular body.

10. The air compressor of claim 8 wherein:

the air mass bypass opening extends parallel to the axes of rotation of the pair of screw rotors.

11. The air compressor of claim 8 wherein:

the actuator comprises:

an actuator member having threads secured to the shuttle;

an elongated screw operatively engageable with the threads of the actuator member;

a motor drivably connected to the elongated screw operable to selectively rotate the elongated screw in opposite rotational directions thereby selectively move the shuttle to open and close the air mass bypass opening.

12. An air compressor operable to generate a mass of air comprising:

a housing including:

a bore providing a pair of parallel chambers;

an air inlet casing having an air mass inlet for allowing an inlet air mass to flow into the chambers;

an air mass outlet for allowing a compressed first air mass to flow out of the chambers;

an air mass bypass passage open to the air inlet casing for allowing an uncompressed second air mass to flow out of the chambers to the air inlet casing;

an air mass bypass opening in communication with the air mass bypass passage and one of said chambers;

a pair of screw rotors having parallel axes of rotation located in the chambers;

members rotatably mounting the pair of screw rotors on the housing for rotation to move the compressed first air mass from the air mass inlet to the air mass outlet and move the uncompressed second air mass to the air mass bypass passage and air inlet casing;

a shuttle located in the air mass bypass passage moveable parallel to the axes of the rotors relative to the air mass bypass opening for selectively opening, partly opening and closing the air mass bypass opening to vary the uncompressed second air mass flowing through the air mass bypass opening to the air inlet casing and the compressed first air mass discharged out of the air mass outlet of the housing;

a pair of rails located in the air mass bypass passage, said pair of rails being joined to the housing and extended parallel to the axes of rotation of the pair of screw rotors;

said shuttle having a body located adjacent one of the pair of screw rotors adapted to be moved to selectively open and close the air mass bypass opening to vary the compressed first air mass discharged from the air mass outlet and the uncompressed second air mass flowing to the air mass bypass passage and the air inlet casing, a plurality of rollers rotatably mounted on the body of the shuttle engageable with the pair of rails to support the shuttle on the rails for movement along the pair of rails to selectively open and close the air mass bypass opening to vary the flow of the compressed first air mass to the air mass outlet and the uncompressed second air mass flowing to the air mass bypass passage;

an actuator operatively connected to the shuttle for moving the shuttle along the pair of rails to selectively open and close the air mass bypass opening to the air mass bypass passage whereby when the air mass bypass opening is open or partly open the uncompressed second air mass flows through the open or partly open air mass bypass opening to the air inlet casing and the compressed first air mass flows through the air mass outlet of the housing and when the air mass bypass opening is closed all of the compressed air mass flows through the air mass outlet of the housing;

said air inlet casing having an air inlet passage and an air mass outlet passage;

said air mass outlet passage being in communication with the air mass inlet of the housing whereby the inlet air mass flows through the air mass inlet passage and air mass outlet passage to the air mass inlet of the housing;

an annular body connected to the air inlet casing and located inwardly within the air inlet casing providing an annular space between the air inlet casing and the annular body;

said air mass bypass passage being open to the annular space whereby the uncompressed second air mass in the air mass bypass passage flows into the annular space between the air inlet casing and the annular body;

said annular body having an annular end located inwardly relative to the air mass outlet passage of the air inlet casing;

said annular end of the annular body being located inwardly of the air inlet casing providing a bypass air mass discharge opening to allow the uncompressed second air mass in the annular space between the air inlet casing and the annular body to entrain and flow with the inlet air mass to the air mass inlet of the housing.

13. The air compressor of claim 12 wherein:

the pair of rails are integral with said housing.

14. The air compressor of claim 12 including:

fasteners cooperating with the rails and housing for securing the rails to the housing.

15. The air compressor of claim 12 wherein:

each of the rails includes a linear first surface and a linear second surface angularly disposed relative to each other located in the air mass bypass passage;

said plurality of rollers having first rollers engageable with the linear first surface of the rails and second rollers engageable with the linear second surface of the rails.

16. The air compressor of claim 12 including:
a wall joined to the housing located adjacent the air mass inlet and the one of said rotors;
said wall being extended from the air mass inlet to the air mass bypass opening for preventing an air mass from flowing into the air mass bypass passage before the uncompressed second air mass flows through the air mass bypass opening to the casing.

17. The air compressor of claim 12 wherein:
the air mass bypass opening extends parallel to the axes of rotation of the pair of rotors.

18. The air compressor of claim 12 wherein:
the actuator comprises:
an actuator member having threads secured to the body of the shuttle;
an elongated screw operatively engageable with the threads of the actuator member;
a motor drivably connected to the elongated screw operable to selectively rotate the elongated screw in opposite rotational directions thereby selectively move the shuttle to open and close the air mass bypass opening.

19. An air compressor operable to generate a mass of air comprising:
a housing including:
a bore providing a pair of parallel chambers;
an air mass inlet for allowing an inlet air mass to flow into the chambers,
an air mass outlet for allowing a compressed first air mass to flow out of the chambers;
an air mass bypass passage open to the air mass inlet for allowing an uncompressed second air mass to flow out of the chambers to the air mass inlet;
an air mass bypass opening in communication with the air mass bypass passage and one of said chambers
a pair of screw rotors having parallel axes of rotation located in the chambers;
members rotatably mounting the pair of screw rotors on the housing for rotation to move the compressed first air mass from the air mass inlet to the air mass outlet and move the uncompressed second air mass to the air mass bypass passage and the air mass inlet;
a shuttle located in the air mass bypass passage moveable parallel to the axes of the pair of screw rotors relative to the air mass bypass opening for selectively opening, partly opening and closing the air mass bypass opening to vary the uncompressed second air mass flowing through the air mass bypass opening to the air mass inlet and the compressed first air mass discharged out of the air mass outlet of the housing;
a pair of rails located in the air mass bypass passage, said pair of rails being joined to the housing and extended parallel to the axes of rotation of the pair of screw rotors;
said shuttle having a body located adjacent one of the pair of screw rotors adapted to be moved to selectively open and close the air mass bypass opening to vary the compressed first air mass discharged from the air mass outlet and the uncompressed second air mass flowing to the air mass bypass passage and the air mass inlet;
a plurality of rollers rotatably mounted on the body of the shuttle engageable with the pair of rails to support the shuttle on the rails for movement along the pair of rails to selectively open and close the air mass bypass opening to vary the flow of the compressed first air mass to the air mass outlet and the uncompressed second air mass flowing to the air mass bypass passage and the air mass inlet;
an actuator operatively connected to the shuttle for moving the shuttle along the pair of rails to selectively open and close the air mass bypass opening to the air mass bypass passage whereby when the air mass bypass opening is open or partly open the uncompressed second air mass flows through the open or partly open air mass bypass opening to the air mass inlet and the compressed first air mass flows through the air mass outlet of the housing and when the air mass bypass opening is closed all of the compressed air mass flows through the air mass outlet of the housing.

20. The air compressor of claim 19 wherein:
the pair of rails are integral with said housing.

21. The air compressor of claim 19 including:
fasteners cooperating with the rails and housing for securing the rails to the housing.

22. The air compressor of claim 19 wherein:
each of the rails includes a linear first surface and a linear second surface angularly disposed relative to each other located in the air mass bypass passage;
said plurality of rollers having first rollers engageable with the linear first surface of the rails and second rollers engageable with the linear second surface of the rails.

23. The air compressor of claim 19 including:
a wall joined to the housing located adjacent the air mass inlet and the one of said rotors;
said wall being extended from the air mass inlet to the air mass bypass opening for preventing an air mass in the chambers of the housing from flowing into the air mass bypass passage before the uncompressed second air mass flows through the air mass bypass opening to the air mass inlet.

24. The air compressor of claim 19 wherein:
the air mass bypass opening extends parallel to the axes of rotation of the pair of screw rotors.

25. The air compressor of claim 19 wherein:
the actuator comprises:
an actuator member having threads secured to the body of the shuttle;
an elongated screw operatively engageable with the threads of the actuator member;
a motor drivably connected to the elongated screw operable to selectively rotate the elongated screw in opposite rotational directions thereby selectively move the shuttle to open and close the air mass bypass opening.

* * * * *